United States Patent [19]
Bellio et al.

[11] Patent Number: 5,728,017
[45] Date of Patent: Mar. 17, 1998

[54] ELECTRONIC TRANSMISSION CONTROL SYSTEM FOR A BICYCLE OR THE LIKE

[75] Inventors: Stephen Bellio, West Roxbury; Gerald P. Eidelman, Jamaica Plain, both of Mass.

[73] Assignee: E.B.T., Inc., Brookline, Mass.

[21] Appl. No.: 666,855

[22] Filed: Jun. 19, 1996

Related U.S. Application Data

[62] Division of Ser. No. 289,087, Aug. 11, 1994, Pat. No. 5,569,104, which is a division of Ser. No. 946,379, Nov. 6, 1992, Pat. No. 5,356,348, which is a continuation-in-part of Ser. No. 520,627, filed as PCT/US91/02948, Apr. 30, 1991, Pat. No. 5,059,158.

[51] Int. Cl.$^6$ .................. F16H 59/00; F16H 9/06
[52] U.S. Cl. .................. 474/70; 474/80; 474/110; 280/261; 364/424.08
[58] Field of Search .................. 474/70, 78, 80, 474/110; 280/261; 364/424.08

[56] References Cited

U.S. PATENT DOCUMENTS

| | | | |
|---|---|---|---|
| 3,919,891 | 11/1975 | Stublmuller et al. | 474/70 |
| 3,926,020 | 12/1975 | Dantowitz et al. | 74/217 |
| 4,490,127 | 12/1984 | Matsumoto et al. | 474/71 X |
| 4,605,240 | 8/1986 | Clem et al. | 474/70 |
| 4,713,042 | 12/1987 | Imhoff | 474/69 |
| 4,887,249 | 12/1989 | Thinesen | 368/10 |
| 4,887,990 | 12/1989 | Bonnard et al. | 474/78 |
| 4,952,196 | 8/1990 | Chilcote et al. | 474/70 |
| 5,059,158 | 10/1991 | Bellio et al. | 474/70 |
| 5,152,720 | 10/1992 | Browning et al. | 474/80 |
| 5,199,929 | 4/1993 | Stites | 474/54 |
| 5,202,627 | 4/1993 | Sale | 324/166 |
| 5,205,794 | 4/1993 | Browning | 474/160 |
| 5,213,548 | 5/1993 | Colbert et al. | 474/71 |
| 5,254,044 | 10/1993 | Anderson | 474/70 |
| 5,261,858 | 11/1993 | Browning | 474/69 |
| 5,266,065 | 11/1993 | Restelli | 474/78 |
| 5,356,348 | 10/1994 | Bellio et al. | 474/70 |
| 5,551,315 | 9/1996 | Pikoulas | 474/70 X |

FOREIGN PATENT DOCUMENTS 2 285 655  9/1975  France ............ G05G 7/02

OTHER PUBLICATIONS

Harumi Takeda, "Bicycle with Computerized Automatic Gear Change Mechanism", Roman System Control, vol. 31, No. 2, pp. 136–140, 1987 (Translatin enclosed).
Zimmer, C., Easy Rider, Discover Magazine, Aug. 1990, p. 30.

*Primary Examiner*—Roger J. Schoeppel
*Attorney, Agent, or Firm*—Wolf, Greenfield & Sacks, P.C.

[57] ABSTRACT

An electro-mechanical system for shifting gears on a multi-gear bicycle or other human-powered vehicle includes a closed loop derailleur position control system using circuitry for measuring derailleur position. Shifting gears is accomplished automatically based on rider cadence or manually using signals supplied by hand operated switches. The system calculates gear ratios based on bicycle speed and cadence and then sorts the gear ratios in order from lowest to highest. During automatic operation, the system calculates a cadence from bicycle speed and gear ratio, determines if the calculated cadence is within predetermined limits set by the rider, and it changes the gear ratio if the calculated cadence is not within the predetermined limits. The system has additional modes of operation which include calibration modes for calibrating the positions of the front and rear derailleurs for each gear, as well as a semi-automatic mode in which the system calculates the cadence from the bicycle speed and gear ratio, and signals the rider to upshift or downshift if the cadence is outside of the predetermined limits selected by the rider. The electronic bicycle transmission control system of the present invention is retrofittable to a wide range of conventional multi-gear bicycles.

12 Claims, 13 Drawing Sheets

ELECTRONIC TRANSMISSION CONTROL SYSTEM FOR A BICYCLE OR THE LIKE

CROSS REFERENCE TO RELATED APPLICATIONS

This application is a division of application Ser. No. 08/289,087 filed Aug. 11, 1994, now U.S. Pat. No. 5,569,104 which is a division of application Ser. No. 07/946,379 filed Nov. 6, 1992, now U.S. Pat. No. 5,356,348, which is a national application of international application number PCT/US91/02948 filed on Apr. 30, 1991, which is a continuation-in-part application of application Ser. No. 07/520,627 filed on May 8, 1990, now U.S. Pat. No. 5,059,158.

BACKGROUND OF THE INVENTION

1. Field of the Invention

The present invention relates generally to the field of bicycles and bicycle control systems used for controlling the transmission of rotational torque generated by a rider to the driving wheel or wheels. More particularly, the present invention relates to a retrofittable, electronic, fully automatic gear shifting control system for multi-gear bicycles.

2. Discussion of the Prior Art

Bicycling is most efficient when the rider maintains a constant number of crank revolutions per minute in spite of changing bicycle speed or changing terrain over which the bicycle is traveling. As used herein, a term "cadence" means the number of crank revolutions per minute or any other cyclic measurement of the rider's activity. A rider generally desires to maintain a cadence that is appropriate for his or her level of physical ability.

In conventional multi-gear bicycles, such as those of a "ten-speed" type, the rider manually changes gears as a function of bicycle speed and difficulty of terrain in order to maintain a comfortable/target cadence. To accomplish this, however, a rider must continuously ascertain what his or her current cadence is and then shift gears as appropriate in order to maintain the preferred cadence. This can be a very subjective process which, as a consequence, is inefficient and imprecise. The rider has to consciously keep track of his or her cadence and shift appropriately, which may be distracting and may adversely affect rider safety. For example, many cyclists do not even know which way to move the shift levers on a multi-gear bicycle in order to increase or decrease their cadence, while some riders find it is difficult to maintain their balance while trying to shift gears because of the requirement of steering with one hand while moving the shift lever(s) with the other hand. In addition, on multi-gear bicycles, the rider must make a small adjustment to the position of the front derailleur whenever the rear derailleur position is changed in order to compensate for the varying chain angle between the rear sprockets and the front chainrings as different gears are selected.

Several prior art systems have been used which attempt to automate the task of shifting the gears. One example of prior art automatic gear shifting systems is the Bike-O-Matic transmission manufactured by Bike-O-Matic, Ltd., of Eagleville, Pa. In the Bike-O-Matic system, tension placed on the chain due to the rider's pedal effort is used to control shifting. High chain tension causes the derailleur to shift the gears into a lower gear while lower chain tension causes the derailleur to shift the gears into a higher gear. Shifting into a lower gear effectively increases the rider's cadence, while shifting into a higher gear effectively decreases the rider's cadence. One problem with the Bike-O-Matic transmission is that it is a mechanical system that relies on chain Tension. During the transition from one gear to another, there is a relatively slow actuation of the derailleur. This slow actuation results in excessive friction caused by rubbing between the chain, derailleur, and sprockets which decreases the rider's efficiency. In addition, when a shift occurs, the mechanism does not position the derailleur in line with sprockets as in the case of manual shifting. The system moves the derailleur continuously rather than discreetly as a function of chain tension. Consequently, the position at which the derailleur stops for a given amount of chain tension may not in fact line up with a particular sprocket on the bicycle.

Furthermore, since the Bike-O-Matic system relies on chain tension, it doesn't help the rider to maintain his or her preferred cadence. For example, on bicycles with multiple front chain rings of different sizes, much greater pedal force would be required to maintain the same chain tension when the rider is using a larger chainring as compared to a smaller chainring. This is because the moment arm of the larger chainring is greater. Using chain tension to control gear shifting can cause shifting at inopportune times, so there could in fact be times when the system will shift gears when the rider does not desire to do so.

Another example of prior art automatic bicycle transmissions is the Browning Electronic Acushift Transmission, manufactured by SunTour. The Browning Transmission electrically shifts the chain using hinged chainring sections. One limitation of the Browning Transmission is that it is designed for use only on the front chainrings of a bicycle. In addition, the Browning Transmission does not use a derailleur, but rather uses a special set of chainrings and electrical controls. Consequently, it is difficult to retrofit this system onto multi-gear bicycles which use conventional derailleurs and chainrings.

Therefore, an object of the present invention is to provide a control system for a human-powered vehicle, such as a bicycle that controls gear shifting so as to maintain a cadence within user-selected limits.

Another object of the invention is to provide a control system for a bicycle that maintains a cadence within user-selected limits over a wide range of bicycle speeds and bicycle gear ratios.

Another object of the present invention is to provide a control system for a bicycle that controls gear shifting automatically so as to maintain a cadence within user-selected limits thereby enhancing rider efficiency and safety.

A further object of the invention is to provide a control system for a bicycle that controls gear shifting automatically and that is retrofittable to a wide range of conventional multi-gear bicycles which use conventional gear shifting systems.

SUMMARY OF THE INVENTION

The foregoing and other objects, features, and advantages of the present invention are achieved in a retrofittable electronic control system for a human-powered vehicle such as a bicycle. The system can operate in a manual, semi-automatic, or fully automatic mode, and can be installed on any conventional bicycle frame. All bicycles include means for transmitting rotational torque generated by a rider to at least one wheel. The means for transmitting power includes, for example, the front chainrings, the chain itself, and the rear sprockets on the bicycle. The invention includes a means for adjusting the transmitting means in order to change gear ratios on the bicycle. In one embodiment, the adjusting means includes actuators and shift arms which cooperate to deflect the bicycle's shift cables from their normal rest position to effect gear changing. The invention further includes a data processor, which may be a microprocessor or the like. In the manual mode of operation, the data processor has previously stored the correct positions for the shift arms for each gear on the bicycle. The rider uses handlebar switches to instruct the data processor to perform a gear shift. In response to signals from the data processor, the actuators and shift arms move the front and rear derailleur shift cables as required to shift gears. Position sensors detect the position of the shift arms and provide a feedback signal to the data processor indicating the current position of the derailleurs. The invention thus provides closed loop control of the positions of the front and rear derailleurs.

In the fully automatic mode of operation, the data processor calculates a cadence from the bicycle's current speed and gear ratio. The system continuously compares the calculated cadence with a set of predetermined cadence limits selected by the rider and determines whether or not the calculated cadence is too high or too low. If the calculated cadence is too low, and the rider is pedaling, the system adjusts the transmitting means, using the actuators and shift arms to move the front and rear derailleurs using closed loop control of the derailleur positions to downshift to the next lower gear. Downshifting increases the gear ratio, which increases the rider's cadence. If, on the other hand, the system determines that the calculated cadence is too high, and the rider is pedaling, the system will upshift to the next higher gear, using the actuators and shift arms to move the derailleurs using closed loop control via the bicycle's shift cables. Upshifting decreases the gear ratio, which decreases the rider's cadence.

The system has additional modes of operation which include calibration modes for calibrating the positions of the front and rear derailleurs for each gear, including multiple positions per chainring for the front derailleur, in order to compensate for the varying chain angle between the front chainrings and the rear sprockets as different gears are selected. A semi-automatic mode of operation is also provided, in which the system calculates the theoretical cadence from the current bicycle speed and gear ratio, and signals the rider to upshift or downshift if the calculated cadence is outside the predetermined limits selected by the rider.

The foregoing and other objects, features, and advantages of the present invention will be more readily understood and apparent from the following detailed description of the invention, which should be read in conjunction with the accompanying drawings, and from the claims which are appended at the end of the detailed description.

DETAILED DESCRIPTION OF THE PREFERRED EMBODIMENTS

Figure 1:
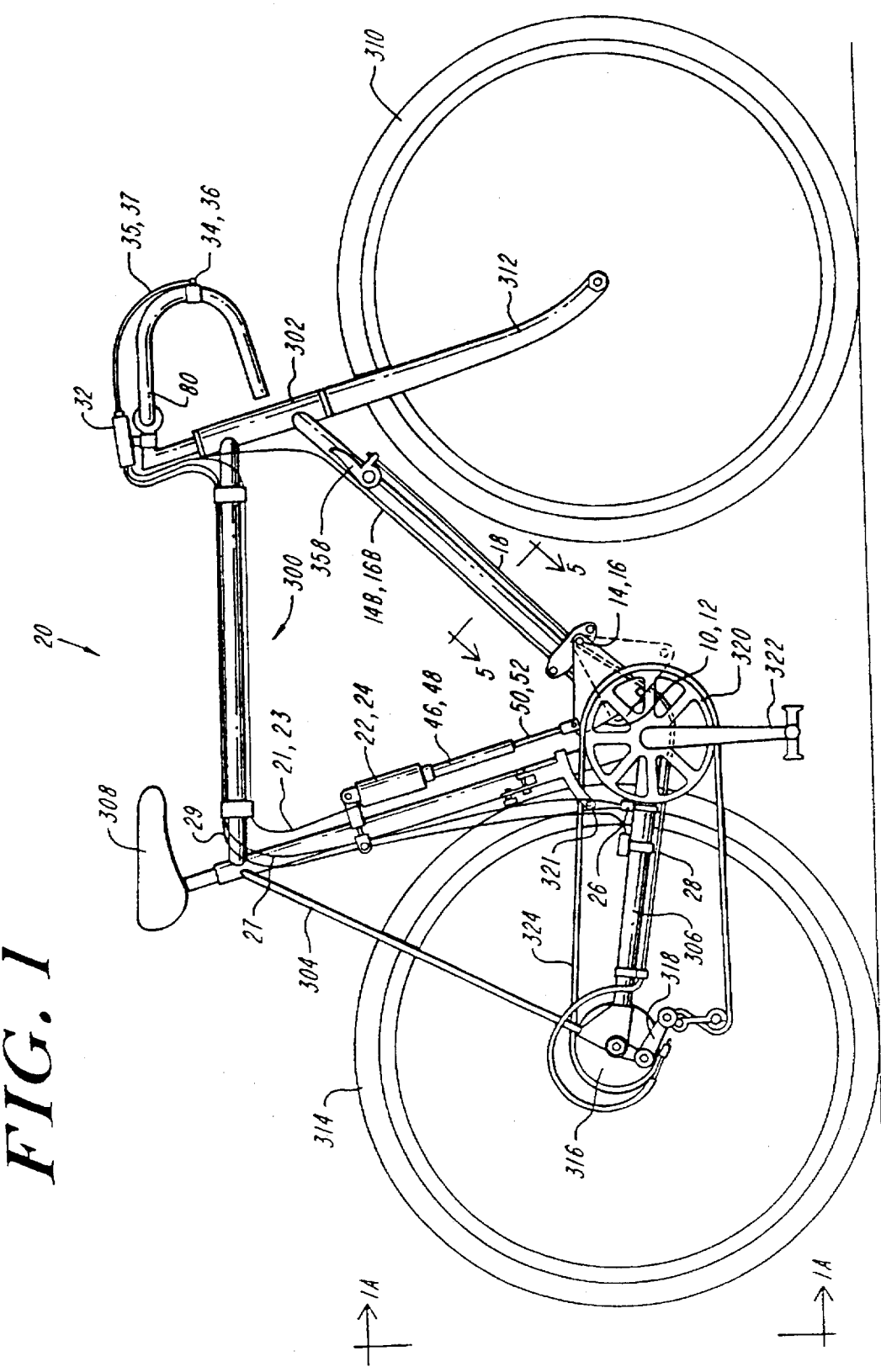
FIG. 1 is a side view of a bicycle with a first embodiment of the electronic transmission control system of the present invention installed thereon.

For purposes of illustration only, and not to limit generality, the present invention will now be explained with reference to its use on a "ten-speed" type of bicycle. However, one skilled in the art will recognize that the present invention is applicable to and can be retrofitted on a wide variety of multi-gear bicycles as well as a variety of human-powered vehicles. In the figures, like elements have been given the same reference characters.

Reference is now made To FIGS. 1–6, which figures illustrate the electronic bicycle transmission control system of the present invention installed or retrofitted onto a conventional ten-speed bicycle 20. A typical bicycle 20 includes a frame 300 having a head tube 302, a down tube 18, a seat tube 40, seat stays 304 and chainstays 306. A seat 308 is attached to the distal end of seat tube 40. A handlebar 80 is mounted onto head tube 302. A front wheel 310 is rotatably mounted to front forks 312, which are in turn connected to handlebar 80 through head tube 302. A rear wheel 314 is rotatably mounted to seat stays 304 and chainstays 306. The bicycle 20 additionally includes rear sprockets 316, rear derailleur 318, front chainrings 320, front derailleur 321, cranks and pedals 322, and a chain 324 for transmitting torque generated by the rider from the front chainrings 320 to the rear sprockets 316. For clarity, these conventional components have been omitted from FIGS. 2–6, but one skilled in the art will realize that they are obviously a part of the bicycle 20.

The control system of the present invention which is retrofitted onto bicycle 20 includes shift arms 10 and 12 which are used to move the rear and front derailleurs, respectively. Shift arms 10 and 12 pivot about shift arm position sensors 14 and 16 that are in turn clamped to the down tube 18 of the bicycle 20. Actuators 22, 24 are connected respectively to shift arms 10 and 12 for changing the position of shift arms 10 and 12 to effectuate the gear changing operation.

The present invention additionally includes a cadence sensor 26, which senses the rider's actual cadence. Cadence sensor 26 may be one of a variety of commercially available types, such as a magnetic, optical, or mechanical type sensor. A preferred sensor is one which employs a magnetic reed switch. This type of sensor uses a magnet mounted to one of the bicycle cranks and a switching element mounted to the bicycle frame. During each revolution of the crank, the magnet passes by the switching element causing a digital pulse to be generated. The invention also includes a wheel sensor 28 which is used to sense the speed of rotation (revolutions per minute or RPM) of the driving wheel 30 (and therefore the speed) of the bicycle. Wheel sensor 28 may be one of a variety of commercially available types, such as a magnetic, optical, or mechanical type sensor. A preferred sensor is one which employs a magnetic reed switch and operates in the same manner as the cadence sensor.

Data supplied by wheel sensor 28, cadence sensor 26, and gear position sensors 14, 16 are supplied to a data processing unit 32 which performs computations to determine cadence, alerts the rider when a gear shift is appropriate, and performs various other control functions to be discussed in greater detail hereinafter. Data processing unit 32 additionally receives inputs from handlebar switches 34 and 36 which the rider uses during calibration and to instruct the system to perform a gear upshift or a gear downshift. Handlebar switches 34 and 36 are conventional magnetic, optical, or mechanical type devices. A preferred switch is a mechanical momentary-action switch. Data processing unit 32 receives data from cadence sensor 26, wheel sensor 28, and handlebar switches 34, 36 over connections 27, 29, 35, and 37 respectively. These connections may be conventional wires, optical fibers, wireless transmit/receive means, or other means, depending on the type of switch or sensor used. Data processing unit 32 additionally sends control signals to actuators 22, 24 over connections 21, 23, which connections may be conventional wires, optical fibers, wireless transmit/receive means, or other appropriate means.

Figure 5:
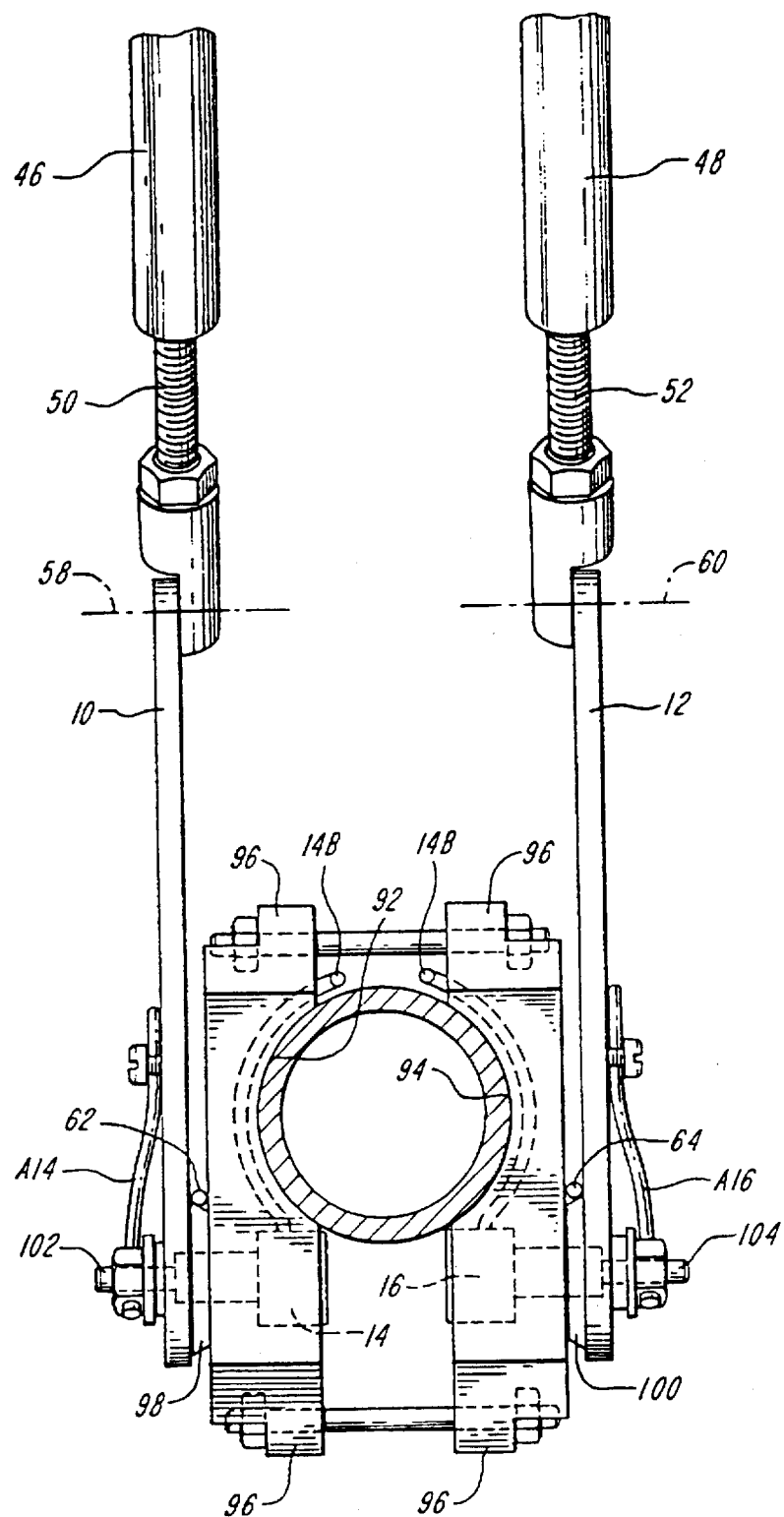
FIG. 5 is a cross-sectional view taken along the line 2—2 in FIGS. 1 and 2 showing the shift arms and gear position sensors used in the bicycle transmission control system of FIG. 1.

The retrofittability of the first embodiment of present invention is enhanced because the entire actuation and gear position sensing mechanism including actuators 22, 24, shift arms 10, 12, and position sensors 14, 16 is clamped to The bicycle frame at only two points. The ends of actuators 22, 24 are secured to the bicycle seat tube 40 by clamp 42 at pivot point 44. Position sensors 14, 16 are clamped to the down tube 18 using brackets 92, 94, as illustrated in FIG. 5, which may be clamped to the down tube 18 by using bolts which pass through holes drilled in bosses 96 and nuts to hold the bolts in place. Cadence sensor 26, wheel sensor 28, data processing unit 32, and handlebar switches 34, 36 may be easily attached to the bicycle 20 using conventional clamping means thereby providing for rapid installation of the present invention onto a conventional bicycle frame. One skilled in the art will appreciate that the present invention may be retrofitted onto a bicycle frame without dismantling or removing any major components of the bicycle.

Figure 3:
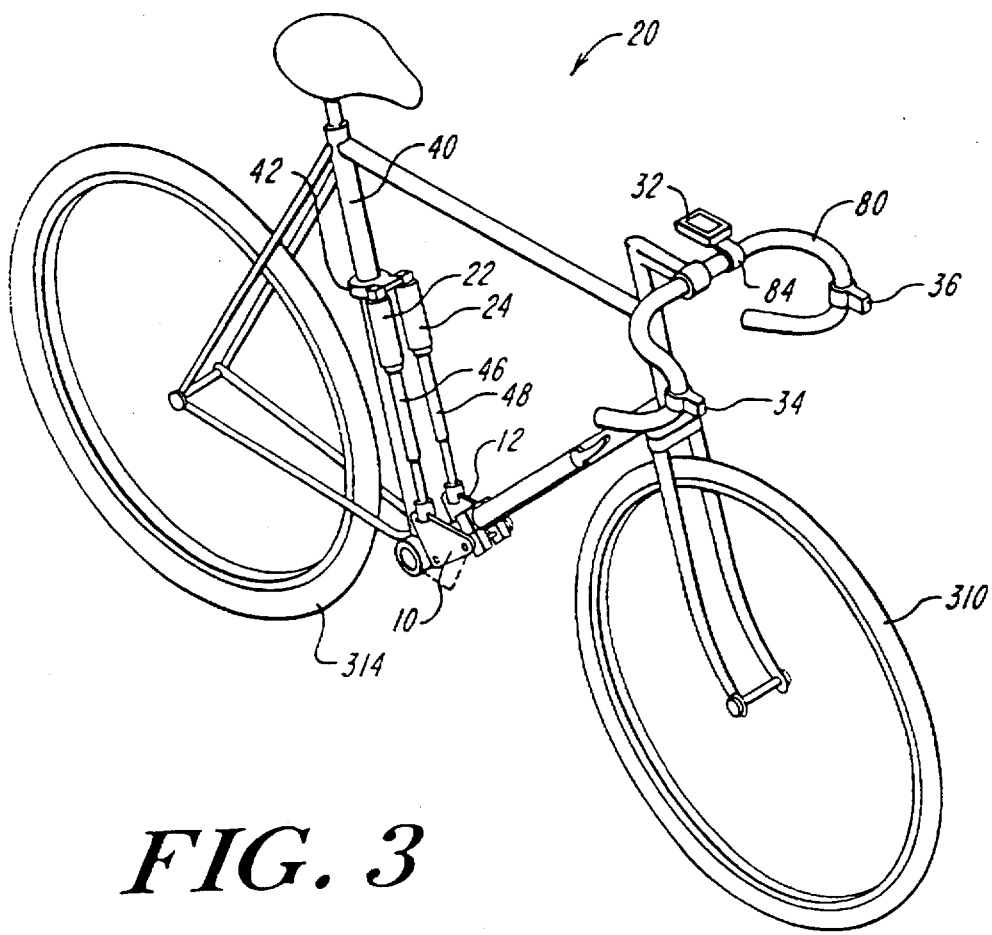
FIG. 3 is a perspective view of the bicycle and electronic-transmission control system of FIG. 1.
Figure 4:
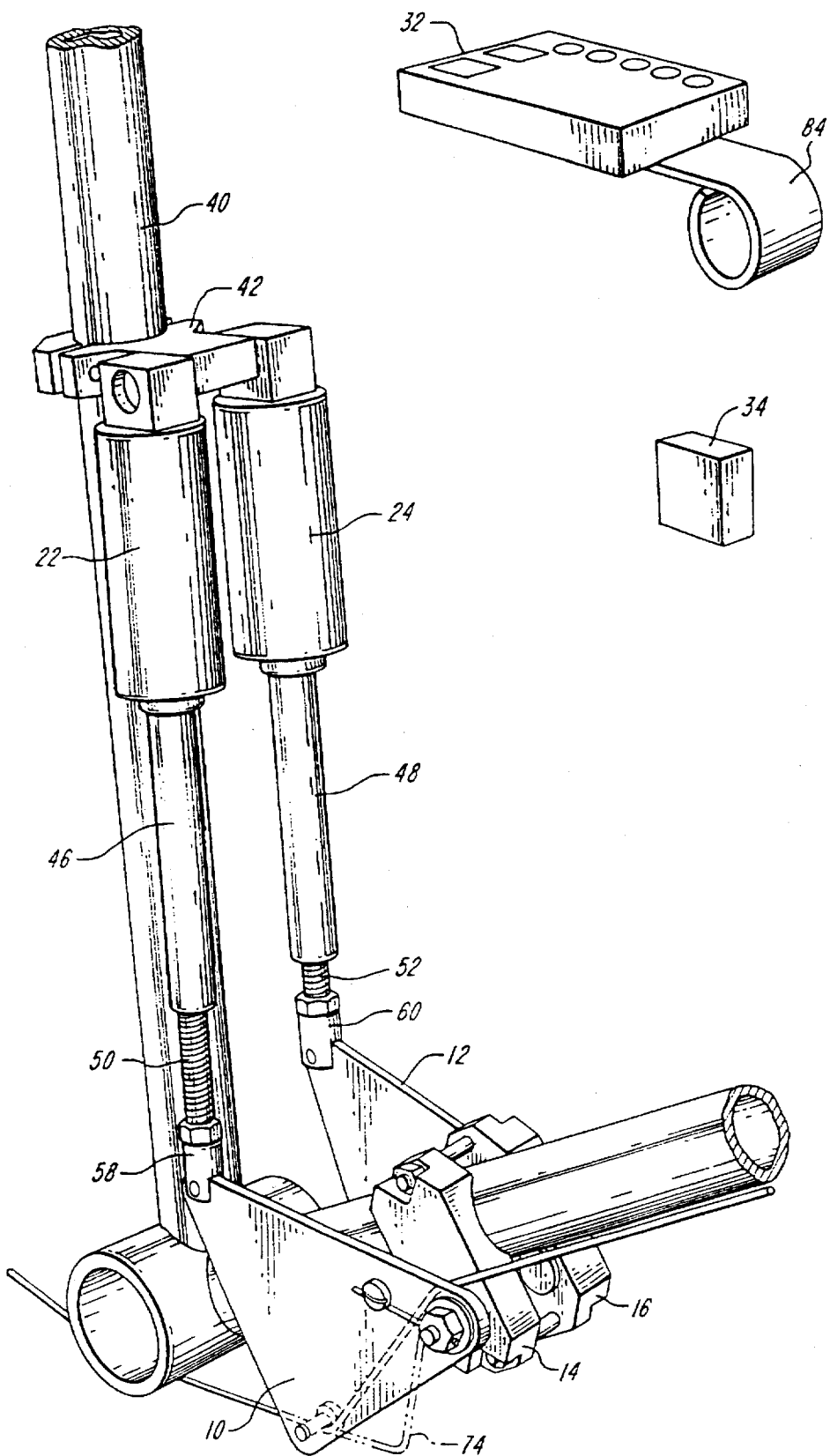
FIG. 4 is a perspective view of the bicycle and electronic-transmission control system of FIG. 3 in greater detail.

Additionally, as shown particularly in FIGS. 3 and 4, actuators 22 and 24 are mounted substantially parallel to seat tube 40 and in close proximity to each other and the seat tube in order to eliminate any interference with the rider's legs during pedaling action. Actuators 22, 24 may be any electromechanical device that produces the motion in shift arms 10 and 12 which is required to effect rapid and precise gear changes.

Figure 2:
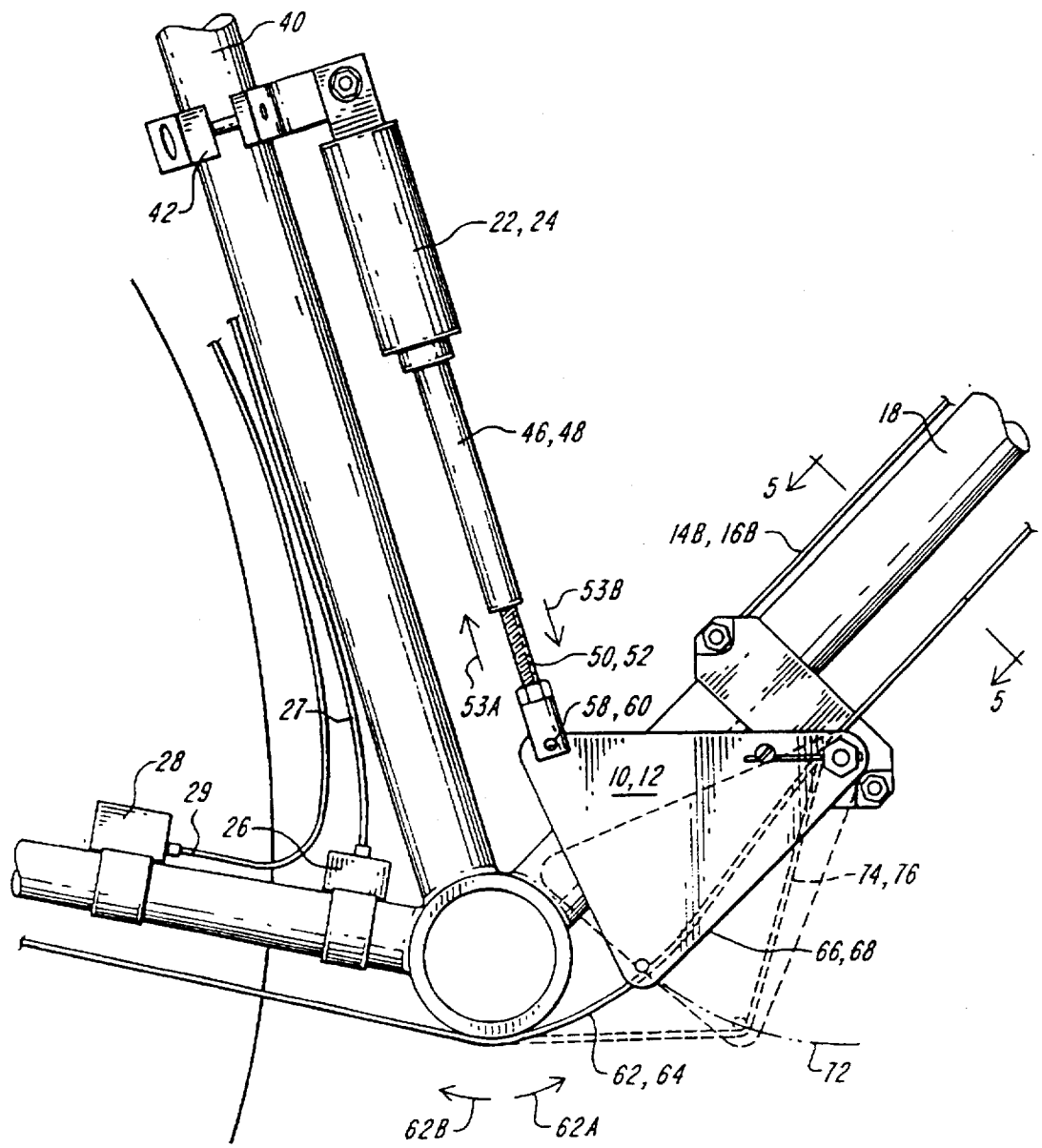
FIG. 2 is a side view of the bicycle and transmission control system of FIG. 1 in greater detail.

In a first embodiment, actuators 22, 24 each include a motor which may be, for example, a DC gear motor, and a battery pack which supplies the necessary power for the motors. Actuators 22, 24 also include rotatable tubular portions 46, 48 which portions rotate clockwise or counterclockwise as driven by the motors housed inside actuators 22, 24. Two threaded shafts 50, 52 extend into the tubular rotatable portions 46, 48 which portions have interior threads that engage the threaded shafts 50, 52. Threaded shafts 50, 52 are connected to brackets 54, 56 and brackets 54, 56 are connected to shift arms 10, 12 at pivot point 58, 60. Shift arms 10 and 12 are configured to provide strength while at the same time eliminating any interference with the conventional operation of the cranks and chainrings of the bicycle. In a first embodiment, shift arms 10 and 12 are bellcranks formed of triangularly shaped planar pieces of a material such as aluminum or steel. Shift control cables 62, 64 which control the position of the front and rear derailleurs (in the case of manual shifting by shift levers 358 mounted on the bicycle down tube or handlebars,) pass between shift arms 10, 12 and brackets 92 and 94 as shown in FIGS. 2 and 5 are in contact with actuation points 66, 68.

Position sensors 14, 16, as particularly illustrated in FIG. 5, are contained within brackets 92, 94. Shift cables 62, 64 pass over beveled cable guides 98, 100, respectively. Beveled cable guides 98, 100, position sensors 14, 16, and shift arm brackets 10, 12 are all coaxially disposed about pivot points 102, 104, respectively. Beveled cable guides 98, 100 are attached to brackets 92 and 94. Arms A14 and A16 are attached to shift arms 10, 12 and position sensors 14, 16 so that rotation of the shift arms 10, 12 causes position sensors 14, 16, to register the position of the shift arms 10 and 12 which in turn registers the position of the rear and front derailleurs of the bicycle. The position sensors 14, 16 may be one of a variety of commercially available optical or mechanical sensors such as encoders. In a first embodiment of the invention, the position sensors are potentiometers and shift arms 10, 12 are connected to the wiping arm of the potentiometers by arms A14 and A16. Varying resistance of the potentiometers as the shift arms 10, 12 are moved is used to sense rear and front derailleur positions. The position of shift arms 10, 12 (and the resulting position of the rear and front derailleurs) as sensed by position sensors 14, 16 is transmitted to data processing unit 32 over connections 14B, 16B for use in controlling bicycle gear shifting. Position sensors 14, 16 are used to provide closed loop control of the front and rear derailleur positions.

During operation of the electronic transmission control system, the actuators 22, 24, under control of data processing unit 32, rotate the tubular portions 46, 48 as the chuck of an electric drill is rotated, for example. As shown in FIG. 2, this rotation causes threaded shafts 50, 52 to be moved along the directions indicated by arrows 53A and 53B. The motion of the threaded shafts 50, 52 causes shift arms 10, 12 to move actuation points 66, 68 in an arc along line 72. Shift cables 62, 64 are therefore moved between their rest positions parallel to down tube 18 and the position indicated by dotted lines 74, 76. Shift cables 62, 64 are held against actuation points 66, 68 by return spring tension in the front and rear derailleurs.

Figure 1A:
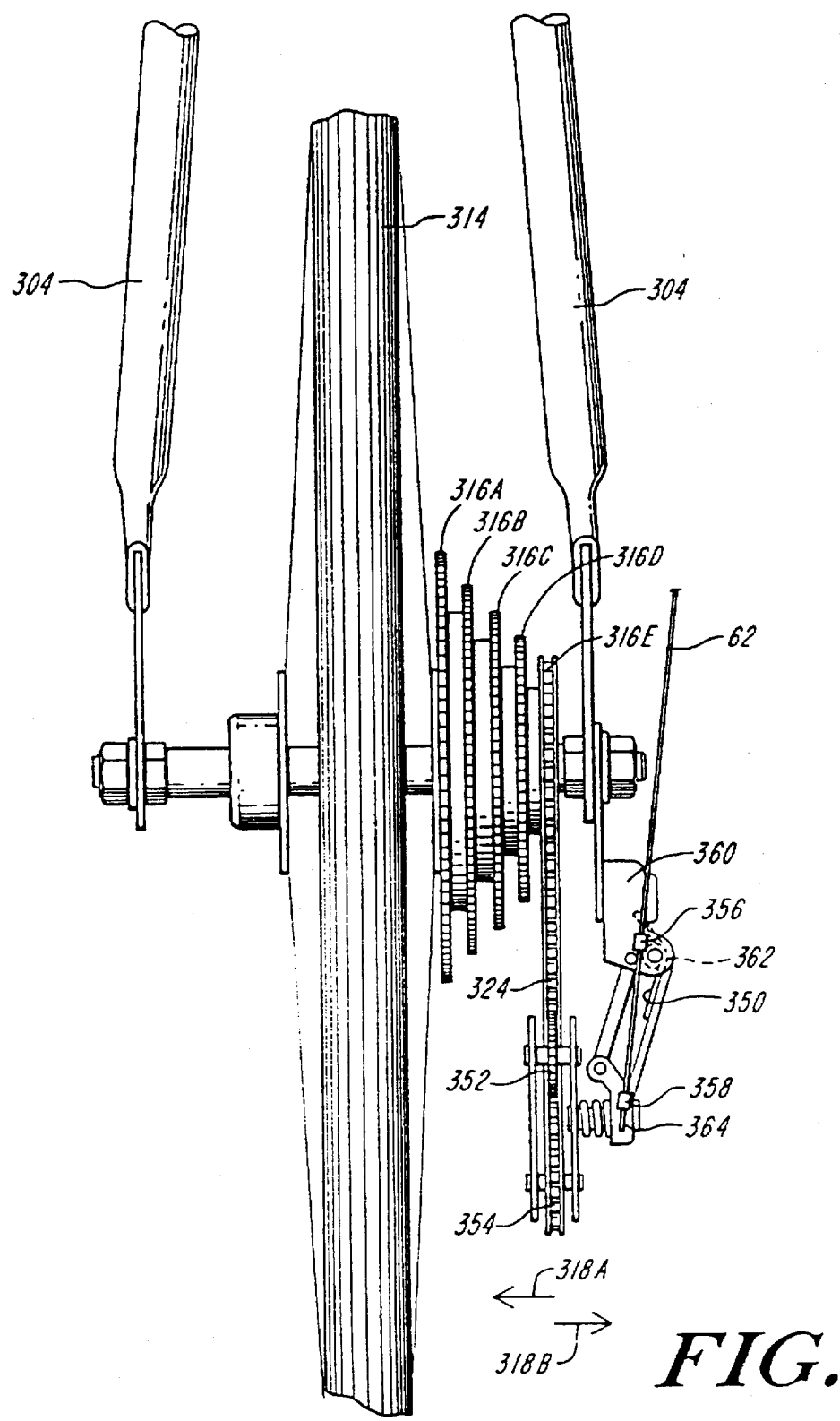
FIG. 1A is a partial end view taken in the direction of line 1A—1A in FIG. 1 illustrating the motion of the rear derailleur during gear changing operations.

Referring to FIG. 1A, there is shown partial end view taken in the direction of line 1—1 in FIG. 1. The rear sprockets include sprockets 316A–816E. Rear derailleur 318 includes pivot joints 360, 362, and 334. A return spring 350 provides spring tension that constantly urges derailleur 318 to a position where the derailleur gears 352 and 354 are in line with rear sprocket 316E. Rear derailleur 318 is effectively biased towards selecting gear 316E.

When tubular portion 46 is rotated so that threaded shaft 54 is moved along the direction of arrow 53B, shift arm 10 moves actuation point 66 in an arc along line 72 towards position 74 of shift cable 62. Since shift cable 62 is anchored at one end by the manual shift levers 358 on the bicycle, the movement of actuation point 66 pulls shift cable 62 in a direction indicated by arrow 62A. The other end of the shift cable 62 passes through shift cable housing 356 and is anchored to the rear derailleur at point 358. Therefore, as shift cable 62 is pulled by actuation point 66 in the direction of arrow 62A, rear derailleur 318 is moved along a direction indicated by arrow 318A to select one of the rear sprockets 316A–316D. This process can continue until actuation point 66 has moved shift cable 62 to the position indicated by dashed line 74 as particularly illustrated in FIG. 2. In this case, rear derailleur 318 is aligned with rear sprocket 316A. From this position, as threaded shaft 54 is moved in a direction along arrow 53A by the rotation of tubular portion 46, actuation point 66 is moved along arc 72 so that shift cable 62 moves along a direction indicated by arrow 62B as shown in FIG. 2. Return spring 350 therefore moves rear derailleur 318 along a direction indicted by arrow 318B as shown in FIG. 1A to move the chain 324 from rear sprocket 316A to one of the other rear sprockets 316D–316E.

The electronic transmission control system of the present invention stores the correct positions for the rear derailleur as programmed by the rider in data processing unit 32. The system only moves rear derailleur 318 in discreet increments equal to the lateral spacing between rear sprockets 316A–316E. Therefore, the chain doesn't get hung up between any of the rear sprockets, as can happen with various prior art systems. One skilled in the art will additionally appreciate that although the shifting operations have been explained with respect to their use in controlling the rear derailleur of a bicycle, a conventional front derailleur 321 as illustrated in FIG. 1, is controlled in the same manner using actuator 24, rotation portion 48, threaded shaft 56, shift arm 12, and actuation point 68, which act on shift cable 64. In addition, the front derailleur, like the rear derailleur, is only moved in discreet increments equal to the lateral spacing between the front chainrings. Consequently, as shift arms 10, 12 move along the arc defined by line 72, the shift cables 62, 64 control the position of the rear and front derailleurs, respectively, in order to select a particular gear ratio.

In a preferred embodiment of the invention, with manual mode selected, handlebar switch 34 is used to instruct the data processing unit 32 to upshift to the next higher gear in order to decrease the gear ratio (and decrease the rider's cadence) while handlebar switch 36 is used to instruct data processing unit 32 to downshift to the next lower gear in order to increase the gear ratio (and increase the rider's cadence). Each time handlebar switch 36 is activated by the rider, the system will downshift by one gear. Each time handle bar switch 34 is activated by the rider, the system will upshift by one gear.

Figure 6:
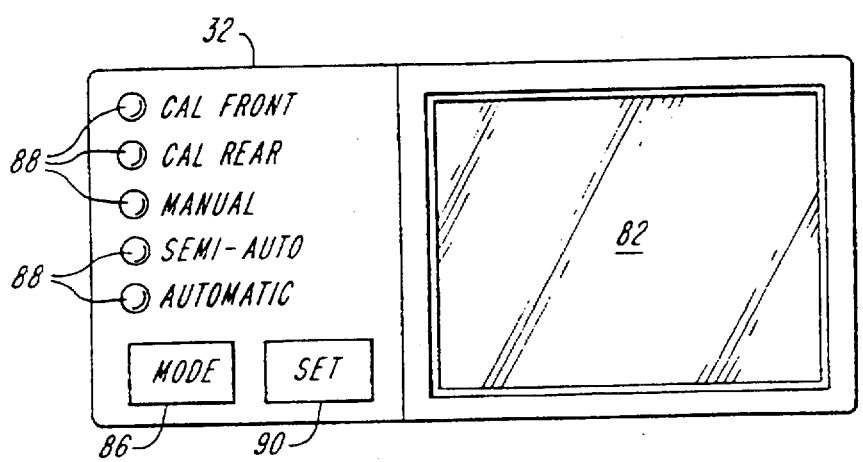
FIG. 6 is a plan view of the control module used in the bicycle transmission control system of FIG. 1.

Data processing unit 32 is clamped to handlebar 80 using bracket 84. As shown in FIG. 6, data processing unit 32 has various control switches which operate to control the electronic bicycle transmission control system. Data processing unit 32 contains a microprocessor, a memory for storing shifting programs as well as user entered data, and analog to digital converters for converting the data from position sensors 14, 16 into a form that can be processed by the microprocessor. Data processing unit 32 is also connected to and receives data from cadence sensor 26, wheel sensor 28, and handlebar switches 34, 36. Data processing unit 32 also contains a display 82 which may be, for example, a liquid crystal or vacuum fluorescent type of display. Display 82 is used to provide a visual indication to the rider of various parameters, such as the rider's cadence, the current gear ratio, current bicycle speed, elapsed time, etc.

Mode switch 86 is used to cycle data processing unit 32 through its various operational modes as selected by the rider. In a preferred embodiment of the invention, the electronic bicycle transmission control system has five operational modes: front calibration, rear calibration, manual, semi-automatic and fully automatic. The rider presses mode switch 86 to sequentially step through the five operational modes and select the particular mode of operation that is desired. Indicators 88, which may be, for example, light emitting diodes, provide a visual indication as to which operating mode has been selected. Set switch 90 is used to enter various parameters into the memory of data processing unit 32.

Figure 11:
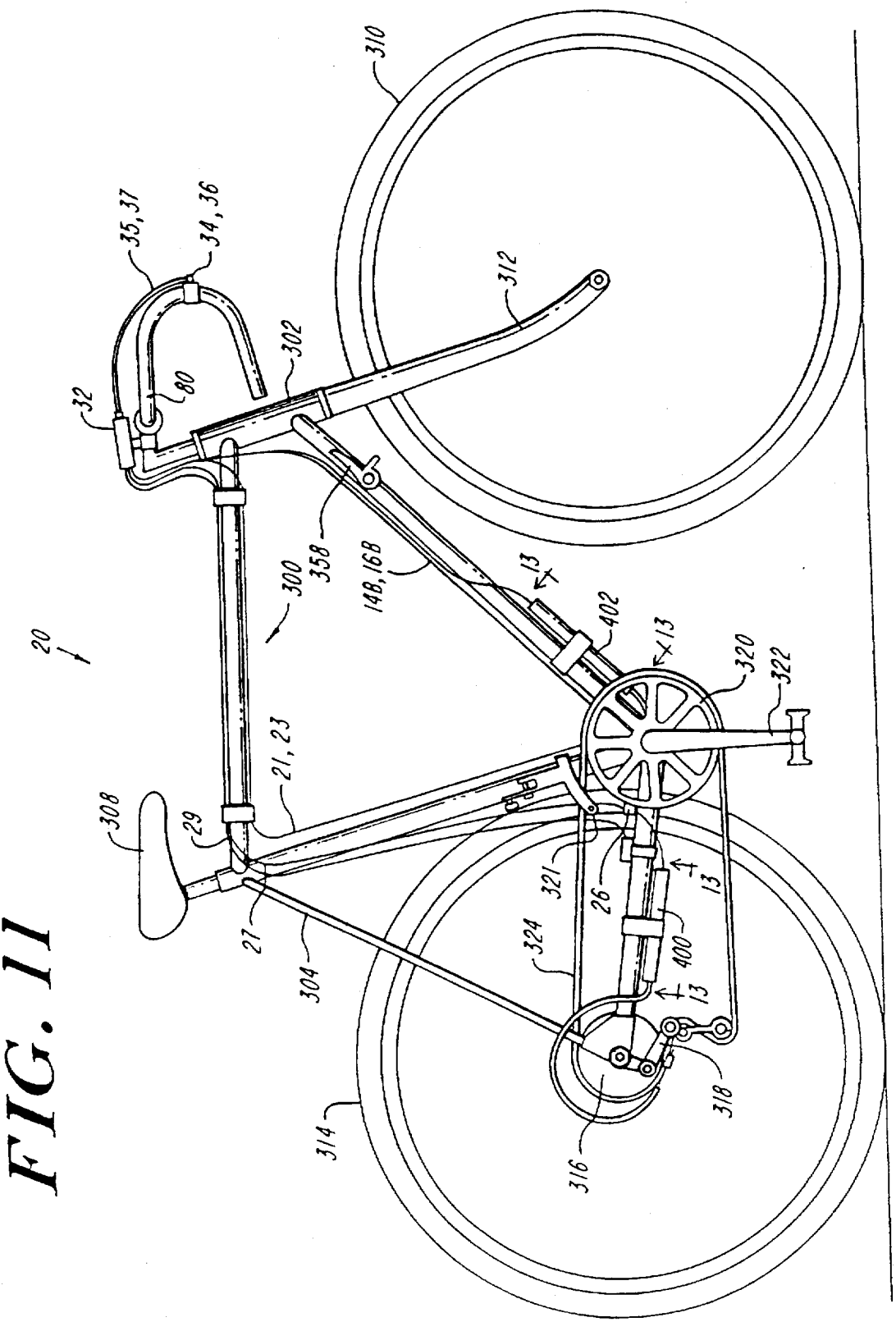
FIG. 11 is a side view of a bicycle with an alternate embodiment of the electronic transmission control system illustrated in FIGS. 1–10 installed thereon.
Figure 12:
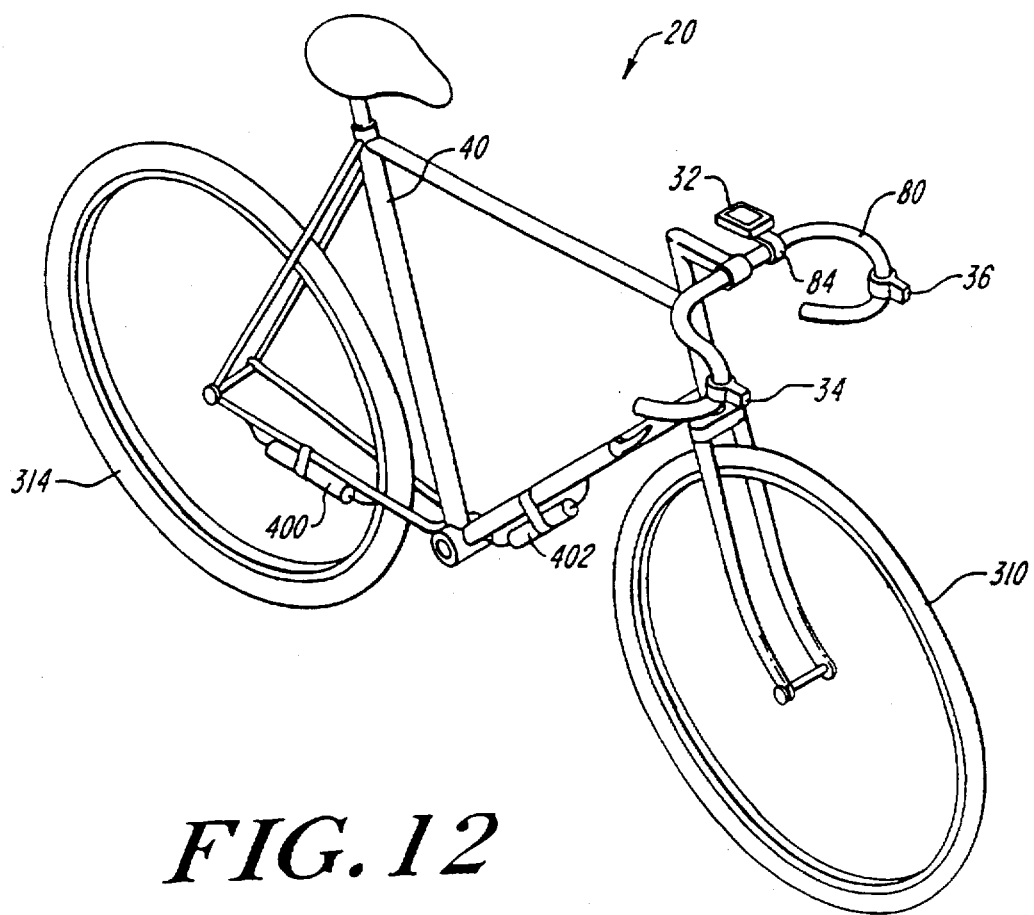
FIG. 12 is a perspective view of the bicycle and electronic transmission control system of FIG. 11.
Figure 13:
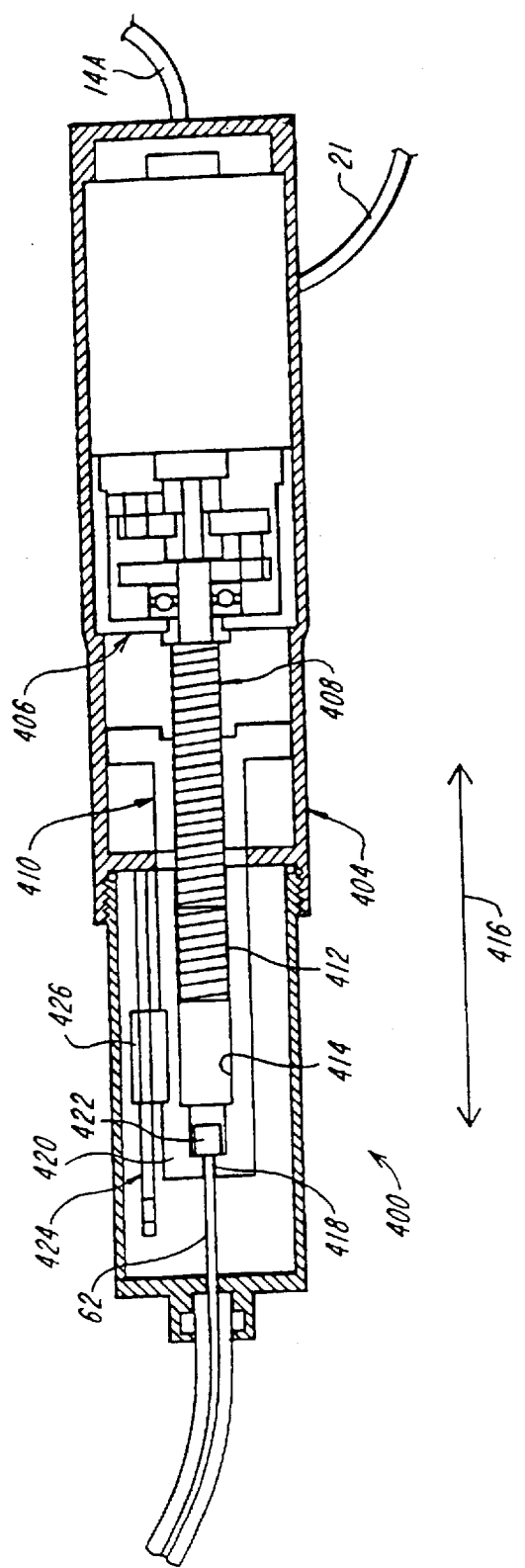
FIG. 13 is a cross sectional view taken along the line 13—13 in FIGS. 11 and 12 of the linear actuator used in the alternate embodiment of the invention illustrated in FIGS. 11 and 12.

Reference is now made to FIGS. 11–13 which figures illustrate an alternate mechanical embodiment of the present invention. This alternate embodiment is retrofittable in addition to being adaptable to be included in a bicycle during the manufacturing process.

In the embodiment of the invention illustrated in FIGS. 11–13, the pivoting shift arms and actuators are replaced by linear actuators which directly control the derailleur cables. A linear actuator is provided for each derailleur that is to be controlled. Linear actuator 400 controls the rear derailleur 318 and linear actuator 402 controls the front derailleur 321. Linear actuators 400 and 402 may be attached to the bicycle frame using a suitable conventional means, such as brackets and bolts and nuts in the manner used to attach actuators 22 and 24 to the bicycle frame. Linear actuators 400, 402 receive control signals from data processing unit 32 over connections 21, 23. Linear actuators 400, 402 may include a battery pack to supply the necessary power for the actuator motors. When the alternate embodiment is used, shift levers 358 may eliminated from the bicycle. Linear actuator 400 is mounted in close proximity to rear derailleur 318 while linear actuator 402 is mounted in close proximity to front derailleur 321. Thus, shift cables 62 and 64 can be considerably shortened.

Reference is now made to FIG. 13, which figure is a cross section along lines 13—13 of linear actuator 400 which is used to control the position of the rear derailleur. However, one skilled in the art will appreciate that the description and operation of linear actuator 402 is the same as for linear actuator 400. Linear actuator 400 includes a housing 404 which contains a DC gear motor 406 which operates on the same principle as the gear motor used in actuators 22, 24. Gear motor 406 drives a lead screw 408 either clockwise or counterclockwise depending upon the desired direction of motion for rear derailleur 318. Linear actuator 400 also includes a cable gripper 410. Cable gripper 410 may be a tubular piece which has a threaded portion 412 disposed on the inside surface 414. Cable gripper 410 is constructed and disposed within housing 404 so that cable gripper 410 does not rotate itself, but translates along the directions defined by double-headed arrow 416 (i.e., along the length of lead screw 408). Cable gripper 410 contains a passage 418 in the end wall 420. Shift cable 62 is inserted through passage 418 and then connected to derailleur 318. Shift cable 62 has a lug 422 disposed at the end of shift cable 62. Lug 422 is sized to be larger than passage 418. Consequently, when gear motor 406 rotates lead screw 408, cable gripper 410 moves along the directions defined by double-headed arrow 416 in order to move shift cable 62 thereby adjusting the position of derailleur 318.

Linear actuator 400 also contains a linear potentiometer 424. Linear potentiometer 424 has a wiper arm that is connected by means 426 to the cable gripper 410. Thus, when cable gripper 410 moves along the directions defined by double-headed arrow 416, the wiper arm of linear potentiometer 424 is moved as well thereby providing a varying resistance. This varying resistance provides a signal that is transmitted to data processing unit 32 via connection 14B in order to provide a positioning signal to be used for closed loop control of the position of derailleur 318.

The embodiment of the invention illustrated in FIGS. 11–13 provides several advantages. First, the alternate embodiment may be mounted inside the frame of the bicycle to avoid any possible contact with the rider. Furthermore, this alternate embodiment of the invention provides the flexibility of mounting along any convenient part of the bicycle frame.

In the alternate embodiment of the invention, cable stretch under load can be minimized by keeping the cable lengths shorter. The linear actuators 400 and 402 can be mounted close to the respective derailleurs which they control, thus improving the repeatability of derailleur positioning and reducing position errors due to stretching of relatively long shift cables. Additionally, the linear actuators may be used as part of the shift cable housing support. This reduces the rigidity requirements of the mounting system.

Overview of System Operation

The electronic bicycle transmission control system of the present invention can be easily retrofitted or installed onto a variety of conventional multi-gear type of bicycles. In one embodiment of the invention, once the system has been installed on the rider's bicycle, the rider places the shift levers that would normally be used during conventional manual shifting of the bicycle gears against their respective stops so that they will not interfere with operation of the electronic transmission control system. In the alternate embodiment of the invention, the position of the shift levers is unimportant because the mechanical cable connection from the shift levers to the derailleurs is eliminated. The alternate embodiment of the invention is retrofittable, but lends itself to installation during the manufacturing process of a bicycle as well. When the bicycle is assembled at the factory, for example, the shift levers and control cables can be omitted, and the linear actuator version of the invention substituted therefor.

In either embodiment of the invention, the processing steps performed by the system and the use of the system by the rider is the same. The rider performs a calibration of the transmission control system in which the data processing unit 32 stores the positions of the shift arms 10, 12 and the particular gear ratio associated with each stored position. Thereafter, the rider may choose from manual, semi-automatic, or fully automatic modes of operation. In the manual mode of operation, shifting will be left up solely to the discretion of the rider. The rider can choose an upshift by activating the right handlebar switch or a downshift by activating the left handlebar switch. In the semi-automatic mode, the system calculates the rider's theoretical cadence for the current gear ratio and bicycle speed and informs the rider, by audible or visual signals, that his or her cadence is outside the preprogrammed limits. The rider still has discretion to choose whether or not to shift the gears via the handlebar switches, as in the manual mode of operation.

In the fully automatic mode of operation, the system continuously calculates the rider's theoretical cadence for the current gear ratio and bicycle speed. The system then determines whether or not this calculated cadence is within the limits chosen by the rider. If the calculated cadence is too low, the system informs the rider, by audible or visual signal, then automatically shifts gears to the next lower gear (decreasing the gear ratio) in order to increase the rider's cadence. Conversely, if the calculated cadence is too high, the system informs the rider, by audible or visual signal, then automatically shifts gears to the next highest gear (increasing the gear ratio) in order to decrease the rider's cadence. In all operating modes, shifting will not occur if the rider is not pedaling. This will prevent derailleur damage. Thus, for all gear ratios and bicycle speeds, the system maintains the rider's cadence within preset limits thereby increasing overall rider efficiency and safety and relieving the rider of the need to manually shift gears.

Detailed Description of the Control Program

Figure 7:
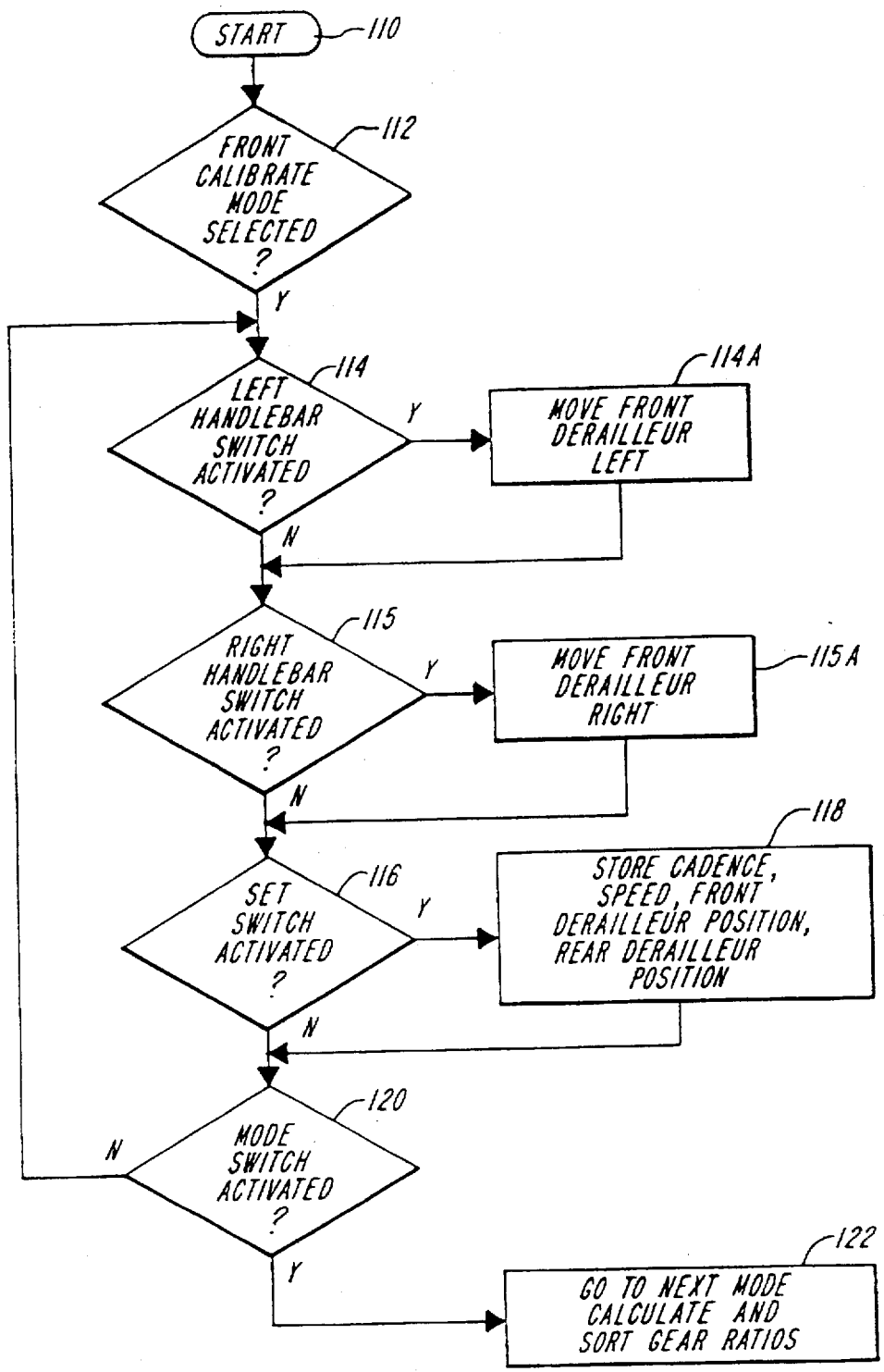
FIG. 7 is a flow chart illustrating the processing steps carried out by the electronic bicycle transmission control system of FIG. 1 in the front derailleur calibration mode.

Reference is now made to FIG. 7, which figure illustrates the processing steps carried out by the system during the front derailleur calibration mode. In this mode, the rider stores the correct positions of the front derailleur for each gear position in the data processing unit's memory. In step 110, the system starts and proceeds to step 112 in which a check is made to determine whether or not the front derailleur calibration mode has been selected. If the answer is no in step 112, the system continues in step 112 until the front derailleur calibration mode is activated or some other mode of operation is selected by the rider. If, on the other hand, the answer is yes in step 112 indicating that the rider has selected the front derailleur calibration mode, the system proceeds to step 114.

In step 114, the system checks to determine whether or not the left handlebar switch 36 has been activated. If the answer is no in step 114, indicating that the left handlebar switch is not activated, the system proceeds to step 115. On the other hand, if the answer is yes in step 114, the system proceeds to step 114A. In step 114A, the system activates actuator 24 to adjust the position of shift arm 12 or actuator 402 to adjust the position of cable gripper 410 which consequently results in an adjustment to the position of the front derailleur. In step 114A, tubular portion 48 or lead screw 408 rotates clockwise, as long as the rider is activating switch 36, so that the front derailleur moves to the left. From step 114A, the system proceeds to step 115.

In step 115, the system checks to determine whether or not the right handlebar switch 34 has been activated. If the answer is no in step 115, indicating that the right handlebar switch is not activated, the system proceeds to step 116. On the other hand, if the answer is yes in step 115, the system proceeds to step 115A. In step 115A, the system activates actuator 24 to adjust the position of shift arm 12 or actuator 402 to adjust the position of cable gripper 410. In step 115A, tubular portion 48 or lead screw 408 rotates counterclockwise, as long as the rider is activating switch 34, so that the front derailleur moves to the right. From step 115A, the system proceeds to step 116.

In step 116, a check is made to determine whether the set switch has been activated. If the answer is no in step 116, the system proceeds to step 120. If, on the other hand, the answer in step 116 is yes, indicating that the user has activated the set switch, the system proceeds to step 118.

In step 118, the system reads the position of the shift arms 12 and 10 from position sensors 16 and 14 or the position of the cable grippers 410 from linear position sensors 424, the current cadence, and the current speed, and stores this information in the memory of data processing unit 32. From step 118, the system proceeds to step 120.

In step 120, the system checks whether the mode switch has been activated. If the answer is no in step 120, the system loops back to step 114 and processing continues as already previously described. The system remains in the front derailleur calibration mode until the user selects another mode by pressing the mode switch 86. On the other hand, if the answer in step 120 is yes, indicating that another mode has been selected, the system proceeds to step 122 and to the next mode in the sequence.

Figure 8:
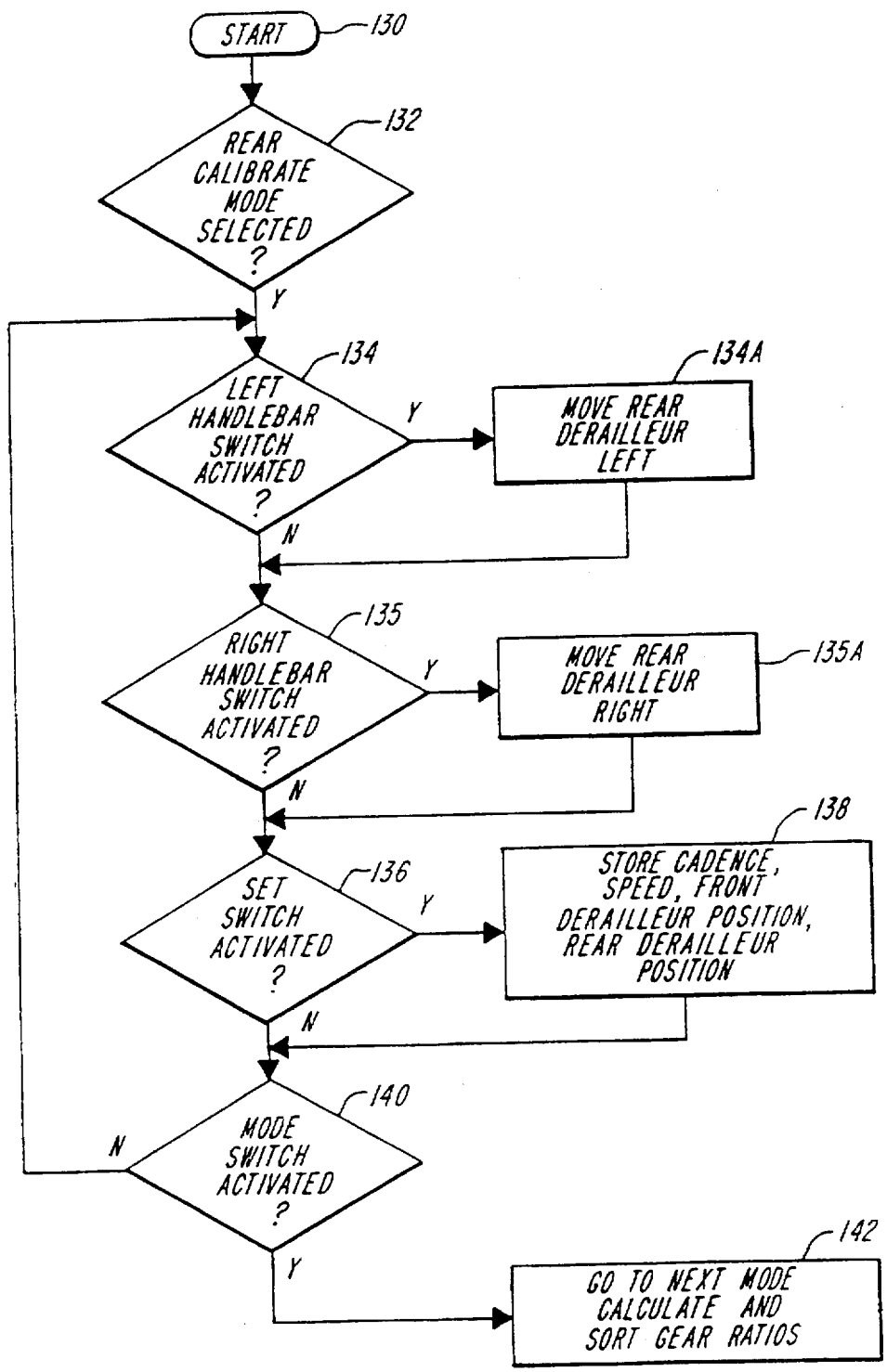
FIG. 8 is a flow chart illustrating the processing steps carried out by the electronic bicycle transmission control system of FIG. 1 in the rear derailleur calibration mode.

Reference is now made to FIG. 8, which figure illustrates the processing steps carried out by the system during the rear derailleur calibration mode. In this mode, the rider stores the correct positions of the rear derailleur for each gear position in the data processing unit's memory. In step 130, the system starts and proceeds to step 132 in which a check is made to determine whether or not the rear derailleur calibration mode has been selected. If the answer is no in step 132, the system continues in step 132 until the rear derailleur calibration mode is activated or some other mode of operation is selected by the rider. If, on the other hand, the answer is yes in step 132 indicating that the rider has selected the rear derailleur calibration mode, the system proceeds to step 134.

In step 134, the system checks to determine whether or not the left handlebar switch 36 has been activated. If the answer is no in step 134, indicating that the left handlebar switch is not activated, the system proceeds to step 135. On the other hand, if the answer is yes in step 134, the system proceeds to step 134A. In step 134A, the system activates actuator 22 to adjust the position of shift arm 10 or actuator 400 to adjust the position of cable gripper 410 which results in an adjustment to the position of the rear derailleur. In step 134A, tubular portion 48 or lead screw 408 rotates clockwise, as long as the rider is activating switch 36, so that the rear derailleur moves to the left. From step 134A, the system proceeds to step 135.

In step 135, the system checks to determine whether or not the right handlebar switch 34 has been activated. If the answer is no in step 135, indicating that the right handlebar switch is not activated, the system proceeds to step 136. On the other hand, if the answer is yes in step 135, the system proceeds to step 135A. In step 135A, the system activates actuator 22 to adjust the position of shift arm 10 or actuator 400 to adjust the position of the cable gripper 410. In step 135A, tubular portion 46 or lead screw 408 rotates counterclockwise, as long as the rider is activating switch 34, so that the rear derailleur moves to the right. From step 135A, the system proceeds to step 136.

In step 136, a check is made to determine whether the set switch has been activated. If the answer is no in step 136, the system proceeds to step 140. If, on the other hand, the answer in step 136 is yes, indicating that the user has activated the set switch, the system proceeds to step 138.

In step 138, the system reads the position of the shift arms 12 and 10 from position sensors 16 and 14 or the position of the cable grippers 410 from linear position sensors 424, the current cadence, and the current speed, and stores this information in the memory of data processing unit 32. From step 138, the system proceeds to step 140.

In step 140, the system checks whether the mode switch has been activated. If the answer is no in step 140, the system loops back to step 134 and processing continues as already previously described. The system remains in the rear derailleur calibration mode until the user selects another mode by pressing the mode switch 86. On the other hand, if the answer in step 140 is yes, indicating that another mode has been selected, the system proceeds to step 142 and to the next mode in the sequence.

When both the front and rear derailleur positions for each gear have been calibrated and stored in the system memory, the system can be operated in any one of the three operational modes; the manual mode, the semi-automatic mode, or the fully automatic mode. When exiting the calibration modes, in steps 122 or 142, the system calculates gear ratios for all gear positions that have been set into memory, using cadence and speed data. The system calculates the gear ratio using the relationship: Gear ratio=wheel RPM/cadence. Using a calculated gear ratio allows the system to carry out the necessary calculations independent of the particular chain and sprocket configuration used to achieve a particular gear ratio. The system then associates each front and rear derailleur position with a respective gear ratio and stores the particular chain and sprocket configuration with the respective gear ratio. The system then sorts the gear ratios and orders them from numerically lowest to numerically highest gear ratio.

Whenever the gears are thereafter shifted either automatically or manually using the handlebar switches, the system automatically moves the front and rear derailleurs to the predetermined respective positions stored in the system memory for the selected gear using closed loop feedback control of the front and rear derailleur positions. Whenever the rear derailleur is moved, the position of the front derailleur is automatically adjusted to compensate for the change in chain angle. The system eliminates minor adjustments to the position of the front derailleur (that have to be performed by the rider manually in conventional manual shifting systems) as the chain moves across the rear sprockets to automatically compensate for sharp chain angles between the front chainrings and the rear sprockets. Further, since the system has sorted and ordered the gear ratios, whenever the rider orders a shift using the handlebar switches, the system automatically selects the next numerically higher or lower gear ratio, regardless of the positions of the front and rear derailleurs.

The rider enters a cadence limit, which is used in the semi-automatic and fully automatic modes, by operating the system in the manual mode and shifting gears. The cadence limit used by the system in the semi-automatic and fully automatic modes is the value of the cadence that the rider was using during his or her last shift while in the manual mode of operation.

Figure 9:
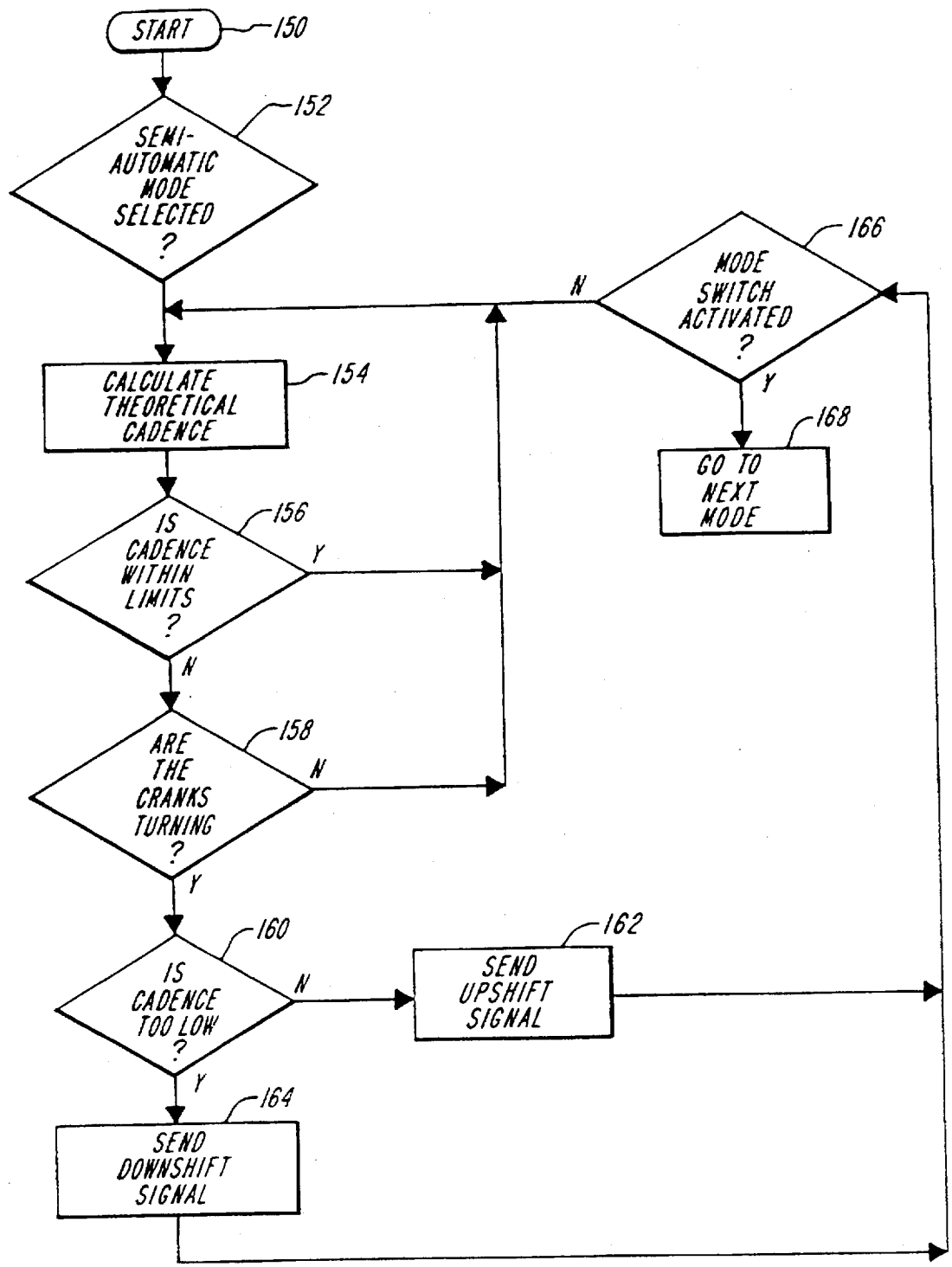
FIG. 9 is a flow chart illustrating the processing steps carried out by the electronic bicycle transmission control system of FIG. 1 in the semi-automatic mode.

Reference is now made to FIG. 9, which figure illustrates the processing steps carried out by the system in the semi-automatic mode of operation. In step 150, the system starts and proceeds to step 152 in which a check is made to determine whether or not the semi-automatic operational mode has been selected. If the answer is no in step 152, the system waits until the semi-automatic mode is activated or some other mode of operation is selected by the rider. If, on the other hand, the answer is yes in step 152 indicating that the rider has selected the semi-automatic mode, the system proceeds to step 154.

In step 154, the system calculates the theoretical cadence using the current gear ratio and bicycle speed data from wheel sensor 28. The calculated cadence is equal to the wheel RPM divided by the current gear ratio. (Gear ratio= wheel RPM/cadence.) From step 154, the system proceeds to step 156.

In step 156, the system determines whether or not the theoretical cadence calculated in step 154 is within the limits last set by the rider in The manual mode. If the answer is yes in step 156, then no change of gear ratio is required and the system proceeds to step 154 and processing continues as already previously described. On the other hand, if the answer in step 156 is no, indicating that the calculated cadence is outside the limits chosen by the rider in initializing step 152, the system proceeds to step 158.

In step 158, the system determines whether or not the cranks are turning, i.e., whether or not the rider is pedaling, by checking the signal from the cadence sensor 26. If the system determines that the cranks are not turning, as may be the case when the rider is gliding, for example, the system proceeds to step 154 and processing continues as already previously described. On the other hand, if the system determines that the cranks are turning, i.e., that the rider is pedaling, the system proceeds to step 160.

In step 160, the system checks to determine whether the calculated cadence is too low. If The answer in step 160 is no, indicating that the cadence is outside the rider's selected limits and is not too low (indicating that the rider's cadence is too high), the system proceeds to step 162. In step 162 an upshift signal, which may be a visual signal on display 82 and/or an audio signal such as two successive beeps is sent to the rider which informs the rider that to maintain his or her cadence within the preprogrammed limits, an upshift is desirable. If the rider decides to upshift, he or she presses handlebar switch 34. From step 162 the system proceeds to step 166.

Returning to step 160, if the system determines that the calculated cadence is outside the rider's selected limits and is too low (indicating that the rider's cadence is too low), the system proceeds to step 164. In step 164, a downshift signal, which may be a visual signal on display 82 and/or an audio signal such as a single heap, is sent to the rider which informs the rider that to maintain his or her cadence within the preprogrammed limits, a downshift is desirable. If the rider decides to downshift, he or she presses handlebar switch 36. From step 164, the system proceeds to step 166.

In step 166, the system checks to determine whether the mode switch has been activated. If the answer is no in step 166, the system proceeds to step 154 and processing continues as already previously described. The system remains in the semi-automatic mode until another mode is selected by the rider. On the other hand, if the system determines in step 166 that the mode switch has been activated, the system proceeds to step 168. In step 168, the system proceeds to the next mode in the sequence.

Figure 10:
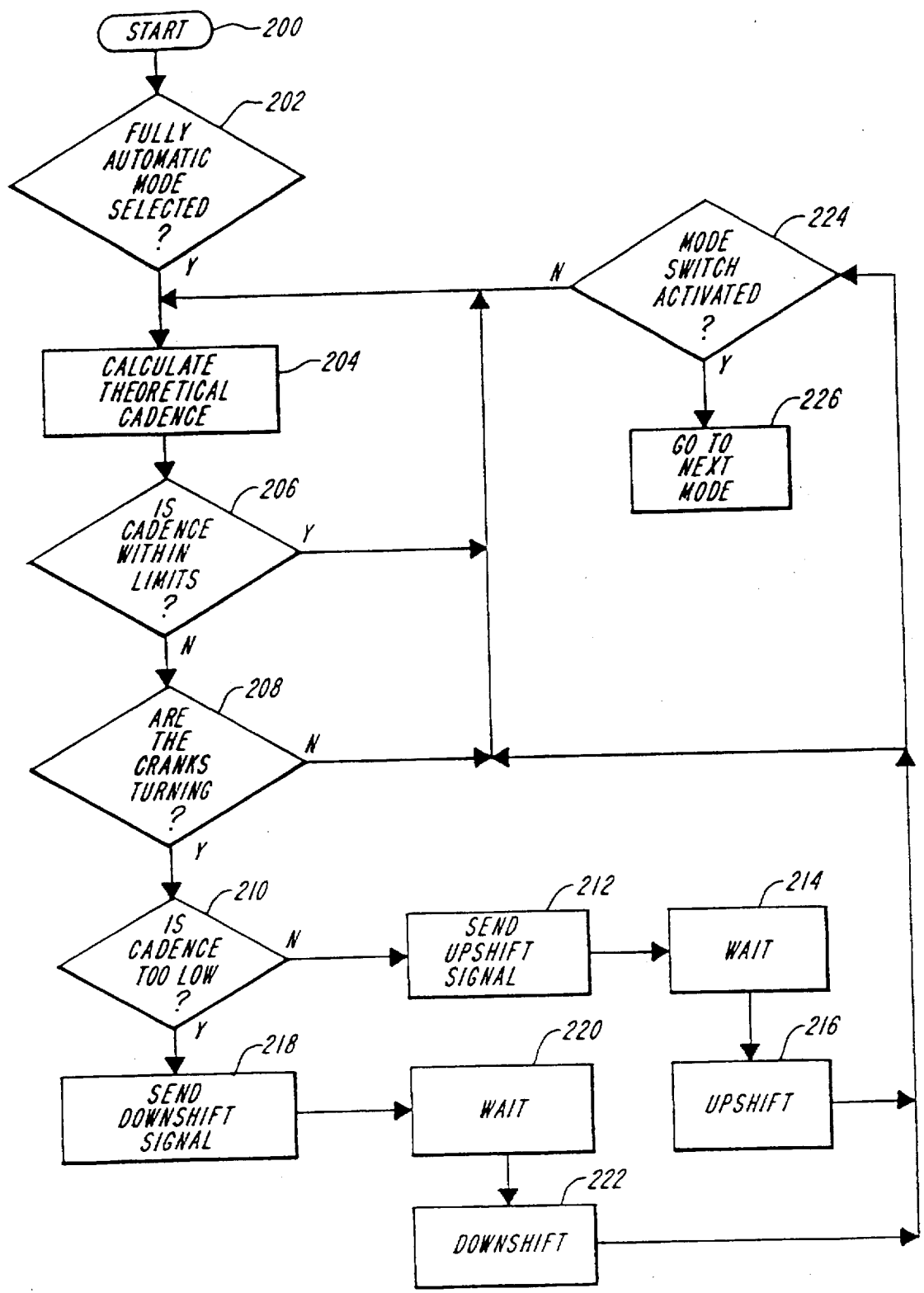
FIG. 10 is a flow chart illustrating the processing steps carried out by the electronic bicycle transmission control system of FIG. 1 in the fully automatic mode.

Reference is now made to FIG. 10, which figure illustrates the processing steps carried out by the system when in the fully automatic mode of operation. In step 200, the system starts and proceeds to step 202 in which a check is made to determine whether or not the fully automatic operational mode has been selected. If the answer is no in step 202, the system waits until the fully automatic mode is activated or some other mode of operation is selected by the rider. If, on the other hand, the answer is yes in step 202 indicating that the rider has selected the fully automatic mode, the system proceeds to step 204.

In step 204, the system calculates the theoretical cadence given the current gear ratio and bicycle speed data from wheel sensor 28. The calculated wheel RPM divided by the cadence is equal to the current gear ratio. (Gear ratio=wheel RPM/cadence.) From step 204, the system proceeds to step 206.

In step 206, the system determines whether or not the theoretical cadence calculated in step 204 is within the limits last set by the rider in the manual mode. If the answer is yes in step 206, then no change of gear ratio is required and the system proceeds to step 204 and processing continues as already previously described. On the other hand, if the answer in step 206 is no, indicating that the calculated cadence is outside the limits chosen by the rider in initializing step 202, the system proceeds to step 208.

In step 208, the system determines whether or not the cranks are turning, i.e., whether or not the rider is pedaling, by checking the signal from the cadence sensor 26. If the system determines that the cranks are not turning, as may be the case when the rider is gliding, for example, the system proceeds to step 204 and processing continues as already previously described. On the other hand, if the system determines that the cranks are turning, i.e., that the rider is pedaling, the system proceeds to step 210.

In step 210, the system checks to determine whether the calculated cadence is too low. If the answer in step 120 is no, indicating that the cadence is outside the rider's selected limits and is not too low (indicating that the rider's cadence is too high), the system proceeds to step 212. In step 212, an upshift signal, which may be a visual signal on display 82 and/or an audio signal such as two successive beeps is sent to the rider which informs the rider that to maintain his or her cadence within the preprogrammed limits, an upshift is to occur. From step 212, the system proceeds to step 214.

In step 214, the system pauses for a fixed amount of time, such as one second. It has been found that some bicycle transmission systems shift better when the rider reduces the torque on the gears during a shifting operation. Therefore, step 214 allows a predetermined pause so that the rider may ease up on the pedals before the shift occurs. From step 214, the system proceeds to step 216.

In step 216, an upshift operation is performed. The upshift operation automatically, and without any action on the part of the rider, shifts the bicycle gears into the next higher gear ratio, which effectively reduces the rider's cadence. From step 216, the system proceeds to step 224.

Returning to step 210, if the system determines that the calculated cadence is outside the rider's selected limits and is too low (indicating that the rider's cadence is too low), the system proceeds to step 218. In step 218, a downshift signal, which may be a visual signal on display 82 and/or an audio signal such as a single beep, is sent to the rider which informs the rider that to maintain his or her cadence within the preprogrammed limits, a downshift is to occur. From step 218, the system proceeds to step 220.

In step 220, the system pauses for a predetermined interval of time in order to allow the rider to ease up on the pedals for those bicycle shifting systems that perform better under reduced pedal pressure. From step 220, the system proceeds to step 222.

In step 222, a downshift operation is performed. During the downshift operation, the electronic control system automatically, and without any action by the rider, moves the bicycle's derailleurs so as to downshift the bicycle by one gear, effectively increasing the gear ratio and increasing the rider's cadence. From step 222, the system proceeds to step 224.

In step 224, the system checks to determine whether the mode switch has been activated. If the answer is no in step 224, the system proceeds to step 204 and processing continues as already previously described. The system remains in the fully automatic mode until another mode is selected by the rider. On the other hand, if the system determines in step 224 that the mode switch has been activated, the system proceeds to step 226. In step 226, the system proceeds to the next mode in the sequence.

To shift quickly and smoothly, overtravel of the derailleur is often required. During overtravel, the derailleur is moved slightly beyond the position which would be required for proper chain and sprocket alignment. As soon as the chain and the sprocket mesh properly, the derailleur is moved to the predetermined position stored in the memory for the particular sprocket in the set of gears. The amount of overtravel required to make an efficient, rapid, and accurate gear shift usually depends on the specific geometry of the derailleur and sprocket. The present invention, as part of its processing, can provide the necessary amount of overtravel for each particular chain and sprocket combination. Furthermore, the amount of overtravel can be reprogrammed depending upon the particular bicycle on which the system is installed. Once the amount of overtravel is determined, it may be stored in the computer on a sprocket by sprocket basis or a fixed amount of overtravel for the system may be provided. When the present invention shifts the gears, either in the manual,semi-automatic, or automatic modes, the derailleur is momentarily moved beyond the center of the intended sprocket (i.e., beyond the predetermined position stored in memory) by the amount of overtravel stored in memory. The derailleur is then moved back to the predetermined position so that the derailleur is aligned with the center of the chosen sprocket.

The present invention thus provides a flexible, reprogrammable derailleur positioning system. Due to the use of highly accurate, close loop feedback control of the front and rear derailleur positions, accurate positioning of the derailleurs is obtained. Furthermore, if the system is installed on a variety of bicycles, the positions of the derailleurs can simply be reprogrammed into the memory of data processing unit 32 thus allowing the system to be installed on a wide variety of bicycles due to this programming capability. For example, linear potentiometer 424 may provide one inch of usable travel. Electronics included in data processing unit 32 including, for example, an eight bit analog to digital converter and a microcomputer yields a linear actuator positioning accuracy of 0.0046 inches (0.117 mm). The high accuracy of the positioning system of the present invention allows the present invention to be installed on different bicycles or on bicycles made by different manufacturers with no changes to the physical configuration of the components. All that would be required is reprogramming of the derailleur positions into the memory of data processing unit 32 to thus accommodate virtually any physical configuration of multi-gear type bicycles.

The electronic bicycle transmission control system of the present invention allows fully automatic control of gear shifting operations while improving the rider's efficiency as well as safety. The control system is retrofittable to a wide range of conventional bicycles and, in one version, adds less than two pounds to the weight of the bicycle and therefore does not adversely affect the weight or handling characteristics of the bicycle. In another embodiment, the system may be built into a bicycle during the manufacturing process. In addition, the system is able to complete a gear shift operation in approximately one second. This shift time is usually faster than a rider is able to achieve manually as well as being more accurate because the correct positions for the derailleurs for each gear have already been stored in the system memory.

Having thus described one particular embodiment of the invention, various alterations, modifications, and improvements will readily occur to those skilled in the art. For example, it will be appreciated that the present invention is not limited solely to ten-speed type bicycles but may in fact be retrofitted on a variety of multi-gear type bicycles such as 15, 20 or even 24 speed bicycles.

One skilled in the art will also realize that the present invention can be integrated into the bicycle itself. Motors, sensors, batteries, and switches can be designed into the frame of the bicycle, thereby decreasing system weight and wind resistance. Furthermore, the handlebar mounted switches could be replaced with voice activated sensors using voice recognition electronics.

Additionally, features of current bicycle computers, including torque measurement for calculation of work output, altimeter functions, heart rate monitoring, downloading data to a computer for displaying and recording the rider's performance, and other features can all be incorporated into the present invention. Some of these capabilities, when added to the present invention, form the basis for an expert system for determining when to shift gears for optimum performance and efficiency. For example, expert system software could learn how a particular rider's power output varies as a function of altitude, heart rate, and cadence, and then control the gear ratio selection accordingly.

One skilled in the art will further appreciate that the present invention is not limited to bicycle applications only, but may be retrofitted on a wide variety of human-powered vehicles. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. A method in a computer-controlled device gear shifting system for shifting gears, the device having a front gear assembly and a rear gear assembly, the front gear assembly having a plurality of from gears with varying number of teeth, the rear gear assembly having a plurality of rear gears with varying number of teeth, the device having a front shift mechanism for shifting from one front gear to another and having a rear shift mechanism for shifting from one rear gear to another, the device having a plurality of device gears, each device gear associated with a front gear and a rear gear combination, the device gears being ordered by gear ratios, the gear ratios being the ratio of the number of teeth in the associated front gear to the number of teeth in the associated rear gear, the system having a computer operatively connected to the front and rear shift mechanisms for shifting from one device gear to another, the method comprising the steps of:

determining a current device gear, the current device gear being defined by the front gear and the rear gear currently selected;

determining a next device gear wherein when shifting from the current device gear to the next device gear, the device shifts into a gear that is within a range that is defined by and includes the current device gear and the next device gear; and controlling the front and rear shift mechanisms to effect a shift from the current device gear to the next device gear.

2. A method in a computer-controlled device shifting system for determining a next device gear in which to shift, the device having a plurality of device gears ordered by gear ratios, the method comprising the steps of:

determining the current device gear selected;

determining legal device gears associated with the current device gear, a legal device gear being a device gear having a gear ratio that is within a range that is defined by and includes the gear ratio of the current device gear and the next device gear; and selecting the next device gear from the determined legal device gears.

3. A method in a computer-controlled shifting system for a multigeared device for shifting from a current device gear to a new device gear, the device having a current speed, the method comprising the steps of shifting the device into a current device gear;

setting a shift speed;

while the device is in the current device gear, adjusting the shift speed; and shifting into a new device gear based on the shift speed and the current speed.

4. A method in a computer-controlled shifting system for the multigeared device for shifting from a current device gear to a new device gear to maintain a desired cadence, the device gears being ordered from a low gear to a high gear, the device having a current speed, the system for shifting down when the current speed decreases to a shift down speed and for shifting up when the current speed increases to a shift up speed, the method comprising the steps of:

when the current speed decreases to the shift down speed, shifting into a new device gear that is lower than the current device gear;

setting the shift up speed to be greater than the current speed;

setting the shift down speed to be less than the current speed; and resetting the shift up speed to closer to the current speed when the current speed decreases to a predefined speed based on the desired cadence; and when the current speed increases to the shift up speed;

shifting into a new device gear that is higher than the current device gear;

setting the shift up speed to be greater than the current speed;

setting the shift down speed to be less than the current speed; and resetting the shift down speed to closer to the current speed when the current speed increases to a predefined speed based on the desired cadence.

5. A method in a computer system for determining a current device gear of a multigeared device, the device having a first gear assembly and a second gear assembly, the computer having a first sensor for detecting movement of the first gear assembly and a second sensor providing a signal indicative of bicycle movement, the first gear assembly having a specified number of gears, the second assembly having a specified number of gears, the current device gear indicating a currently selected gear for the first gear assembly and a currently selected gear for the second gear assembly, the method comprising the steps of:

during a specified interval, detecting movement of the first gear assembly and detecting the signal from the second sensor; and determining the current device gear based on the detected movement of the first gear assembly and the signal provided by the second sensor.

6. A method in a computer-controlled bicycle shifting system for shifting a bicycle, the method comprising the steps of:

determining a new bicycle gear;

determining whether the bicycle is being pedalled in a forward direction; and shifting to the new bicycle gear when the bicycle is being pedalled in the forward direction.

7. A method in a computer-controlled bicycle shifting system for overriding a computer-generated bicycle gear election, the system having a computer and a shifting mechanism, the computer for generating a bicycle gear selection to maintain a desired cadence and for controlling the shifting mechanism to shift the bicycle into the generated bicycle gear selection, the method comprising the steps of:

detecting the signal indicating that the computer-generated bicycle selection is to be overridden;

determining an overriding bicycle gear selection;

controlling the shifting mechanism to shift the bicycle into the overriding bicycle gear; and resetting the desired cadence to a new desired cadence based on a current bicycle speed and the determined overriding bicycle gear selection.

8. A gear shifting system for shifting gears on a bicycle, comprising;

a front gear assembly having a plurality of front gears with varying number of teeth;

a rear gear assembly having a plurality of rear gears with varying number of teeth;

a chain coupled to the front gear assembly for engaging any one of the front gears and to the rear gear assembly for engaging any one of the rear gears;

a front shift mechanism for shifting the chain from engaging one front gear to engaging another;

a rear shift mechanism for shifting the chain from engaging one rear gear to engaging another, wherein the bicycle has a plurality of bicycle gears, each bicycle gear associated with a front gear and a rear gear combination, the bicycle gears being ordered by gear ratios, the gear ratios being the ratio of the number of teeth in the associated front gear to the number of teeth in the associated rear gear; and a computer operatively connected to the front and rear shifting mechanisms, wherein the computer determines a current bicycle gear, the current bicycle gear being defined by the front gear and the rear gear currently engaged by the chain, the computer determines a next bicycle gear wherein when shifting from the current bicycle gear to the next bicycle gear, the bicycle does not shift into a gear that is outside the range of the current bicycle gear and the next bicycle gear, and the computer controls the front and rear shift mechanisms to effect a shift from the current bicycle gear to the next bicycle gear.

9. A computer-controlled shifting system for a multigeared bicycle for shifting from a current bicycle gear to a new bicycle gear, comprising:

means for determining a current speed of the bicycle, the cadence indicating the pedaling rate;

means for shifting the bicycle into a current bicycle gear;

means for setting a shift speed;

means for resetting a shift speed when the bicycle is in the current bicycle gear; and means for shifting into a new bicycle gear when the current speed approaches the shift speed.

10. A system for determining a current bicycle gear of a multigeared bicycle, the bicycle having a first gear assembly and a second gear assembly, comprising:

a first sensor for generating a first signal indicating movement of the first gear assembly;

a second sensor for generating a second signal indicative of bicycle movement; and a computer for receiving the first and second signals during an interval, and for determining the current bicycle gear based on the signal provided by the first sensor and the signal provided by the second sensor.

11. A bicycle shifting system for shifting a multigeared bicycle, comprising:

means for determining a new bicycle gear;

means for determining whether the bicycle is being pedalled in a forward direction; and means for shifting to the new bicycle gear when the bicycle is being pedalled in the forward direction.

12. A bicycle shifting apparatus, the bicycle having a rear wheel, a crank, a front gear assembly, and a rear gear assembly, comprising:

a rear wheel sensor for detecting the speed of the rear wheel;

a crank sensor for detecting angular movement of the crank;

a front gear selector operatively connected to the front gear assembly for shifting front gears;

a rear gear selector operatively connected to the rear gear assembly for shifting rear gears; and a computer for receiving input from the rear wheel sensor, and crank sensor and controlling the front gear selector and the rear gear selector to effect the shifting of the bicycle.

* * * * *

(12) EX PARTE REEXAMINATION CERTIFICATE (5565th)
United States Patent
Bellio et al.

(10) Number: US 5,728,017 C1
(45) Certificate Issued: Oct. 17, 2006

(54) ELECTRONIC TRANSMISSION CONTROL SYSTEM FOR A BICYCLE OR THE LIKE

(75) Inventors: Stephen Bellio, West Roxbury, MA (US); Gerald P. Eidelman, Jamaica Plain, MA (US)

(73) Assignee: E.B.T., Inc., Brookline, MA (US)

Reexamination Request:
No. 90/007,254, Oct. 13, 2004

Reexamination Certificate for:
Patent No.: 5,728,017
Issued: Mar. 17, 1998
Appl. No.: 08/666,855
Filed: Jun. 19, 1996

Related U.S. Application Data

(60) Division of application No. 08/289,087, filed on Aug. 11, 1994, now Pat. No. 5,569,104, which is a division of application No. 07/946,379, filed as application No. PCT/US91/02948 on Apr. 30, 1991, now Pat. No. 5,356,348, which is a continuation-in-part of application No. 07/520,627, filed on May 8, 1990, now Pat. No. 5,059,158.

(51) Int. Cl.
*F16H 59/00* (2006.01)
*F16H 9/06* (2006.01)

(52) U.S. Cl. ............... 474/70; 280/261; 474/110; 474/80; 701/51

(58) Field of Classification Search ............... None
See application file for complete search history.

(56) References Cited

U.S. PATENT DOCUMENTS

| | | | |
|---|---|---|---|
| 3,919,891 A | 11/1975 | Stuhlmuller et al. |
| 4,490,127 A | 12/1984 | Matsumoto et al. |
| 5,059,158 A | 10/1991 | Bellio et al. |
| 5,213,548 A | 5/1993 | Colbert et al. |
| 5,254,044 A | 10/1993 | Anderson |
| 5,261,858 A | 11/1993 | Browning |

*Primary Examiner*—Matthew C. Graham

(57) ABSTRACT

An electro-mechanical system for shifting gears on a multi-gear bicycle or other human-powered vehicle includes a closed loop derailleur position control system using circuitry for measuring derailleur position. Shifting gears is accomplished automatically based on rider cadence or manually using signals supplied by hand operated switches. The system calculates gear ratios based on bicycle speed and cadence and then sorts the gear ratios in order from lowest to highest. During automatic operation, the system calculates a cadence from bicycle speed and gear ratio, determines if the calculated cadence is within predetermined limits set by the rider, and it changes the gear ratio if the calculated cadence is not within the predetermined limits. The system has additional modes of operation which include calibration modes for calibrating the positions of the front and rear derailleurs for each gear, as well as a semi-automatic mode in which the system calculates the cadence from the bicycle speed and gear ratio, and signals the rider to upshift or downshift if the cadence is outside of the predetermined limits selected by the rider. The electronic bicycle transmission control system of the present invention is retrofittable to a wide range of conventional multi-gear bicycles.

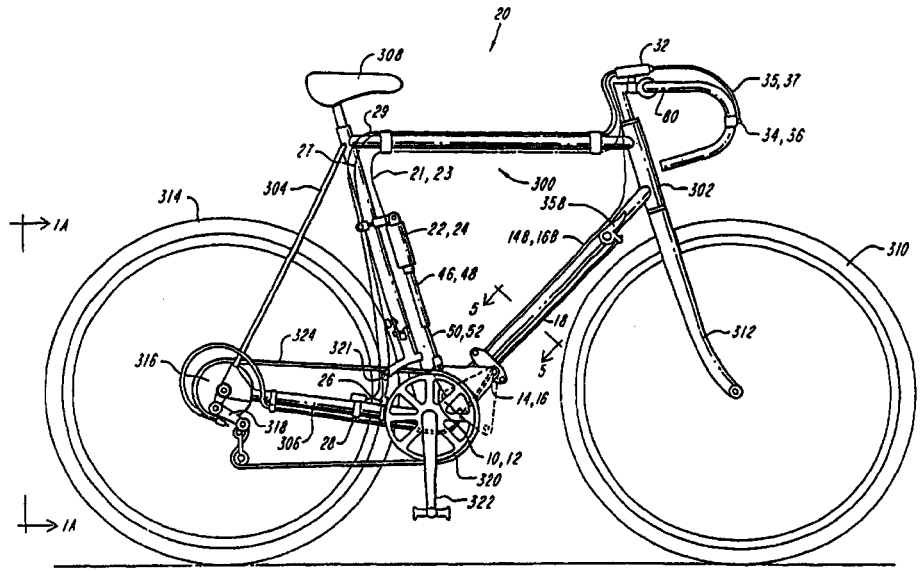

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1–12 are cancelled.

* * * * *